United States Patent
Freire Martins et al.

(10) Patent No.: US 12,514,845 B2
(45) Date of Patent: Jan. 6, 2026

(54) IONIC-LIQUID-BASED FORMULATIONS FOR THE PREVENTION OR TREATMENT OF NEUROLOGICAL DISEASES

(71) Applicants: Universidade De Aveiro, Aveiro (PT); Universidade Da Beira Interior, Covilhã (PT)

(72) Inventors: Mara Guadalupe Freire Martins, Aveiro (PT); Ana Catarina Almeida Sousa, Aveiro (PT); Mukesh Sharma, Aveiro (PT); João Manuel Costa Araújo Pereira Coutinho, Ílhavo (PT); Ana Clara Braz Cristóvão, Covilhã (PT); Dina Batista Pereira, Covilhã (PT)

(73) Assignees: Universidade De Aveiro, Aveiro (PT); Universidade Da Beira Interior, Covilhã (PT)

( * ) Notice: Subject to any disclaimer, the term of this patent is extended or adjusted under 35 U.S.C. 154(b) by 0 days.

(21) Appl. No.: 18/725,257

(22) PCT Filed: Jan. 26, 2023

(86) PCT No.: PCT/IB2023/050671
§ 371 (c)(1),
(2) Date: Jun. 28, 2024

(87) PCT Pub. No.: WO2023/144742
PCT Pub. Date: Aug. 3, 2023

(65) Prior Publication Data
US 2024/0415815 A1    Dec. 19, 2024

(30) Foreign Application Priority Data
Jan. 26, 2022 (PT) .......................... 117761

(51) Int. Cl.
*C07D 239/20* (2006.01)
*A61K 31/4166* (2006.01)
*C07D 233/54* (2006.01)
*C07D 233/96* (2006.01)

(52) U.S. Cl.
CPC ........ *A61K 31/4166* (2013.01); *C07D 233/54* (2013.01); *C07D 233/96* (2013.01); *C07D 239/20* (2013.01)

(58) Field of Classification Search
CPC .............. A61K 31/4166; C07D 233/54; C07D 239/20; C07D 233/96
See application file for complete search history.

(56) References Cited

U.S. PATENT DOCUMENTS

| | | |
|---|---|---|
| 2013/0109714 A1 | 5/2013 | Ariga |
| 2013/0143939 A1 | 6/2013 | Bara |
| 2014/0023603 A1 | 1/2014 | Chung et al. |
| 2016/0102065 A1 | 4/2016 | Chung et al. |
| 2017/0014353 A1 | 1/2017 | Tatsumi et al. |
| 2017/0071902 A1 | 3/2017 | Takemoto et al. |
| 2019/0048001 A1 | 2/2019 | Doroshow et al. |
| 2020/0270214 A1 | 8/2020 | Guener et al. |
| 2020/0289671 A1 | 9/2020 | Choi et al. |
| 2020/0385342 A1 | 12/2020 | Wall |
| 2022/0193117 A1 | 6/2022 | Yang et al. |

FOREIGN PATENT DOCUMENTS

| | | |
|---|---|---|
| AU | 2012201058 | 3/2012 |
| CN | 103330708 | 10/2013 |
| CN | 111138376 | 5/2020 |
| JP | 2020-063283 | 4/2020 |
| KR | 2008-0051246 | 6/2008 |
| KR | 2012-0091650 | 8/2012 |
| KR | 2020-0022193 | 3/2020 |
| MX | 2016011152 | 8/2016 |
| SG | 10201808940 | 11/2018 |
| WO | WO 2010/078258 | 7/2010 |
| WO | WO 2018/129421 | 7/2018 |
| WO | WO 2020/205937 | 10/2020 |

OTHER PUBLICATIONS

Megan Beck, RN ("Vein of Galen Malformation." Cincinnati Children's (Sep. 2022); https://www.cincinnatichildrens.org/health/v/vein-of-galen-malformation). (Year: 2022).*
Children's of Alabama ("Diagnosis and Treatment of VOGM." https://www.childrensal.org/diagnosis-and-treatment-vogm. Accessed Nov. 15, 2024.) (Year: 2024).*
"Phase II Failures: 2008-2010—Biobusiness Briefs, Trial Watch", Nature Reviews Drug Discovery, 10: 2P., May 2011.
International Search Report Dated Jun. 15, 2023 From the International Searching Authority Re. Application No. PCT/IB2023/050671. (5 Pages).
Search Report Dated Mar. 4, 2024 From the National Institute of Industrial Property of Portugal Re. Application No. 117761. (5 Pages).
Abednejad et al. "Polyvinylidene fluoride-Hyaluronic Acid Wound Dressing Comprised of Ionic Liquids for Controlled Drug Delivery and Dual Therapeutic Behavior", Acta Biomaterialia, 100: 142-157, Dec. 2019.
Afonso "Testing the Application of New Antioxidant Chemical Formulations to Prevent Neuronal Degeneration", Biotecnologia, (2° ciclo de estudos): 73p., 2017.
Araujo et al. "Cholinium-Based Ionic Liquids with Pharmaceutically Active Anions+", RSC Advances., 53(4; 28126): , First Published Jun. 11, 2014.
Aurora "(5Z)-5-[(2,4-Dihydroxyphenyl)methylidene]-2-Sulfanylideneimidazolidin-4-one", Aurora Fine Chmicals, 1P., 1990.
Bae et al. "Synthesis and Biological Evaluation of 3-Substituted 5-Benzylidene-1-Methyl-2-Thiohydantoins as Potent NADPH Oxidase (NOX) Inhibitors", 24(18):4144-4151, Sep. 15, 2016.

(Continued)

*Primary Examiner* — James H Alstrum-Acevedo
*Assistant Examiner* — Chris E Simmons

(57) ABSTRACT

The present disclosure relates to an ionic liquid (IL)-based formulation comprising inhibitors of NADPH oxidases enzymes (Nox's), preferably isoforms 1 and 4, in particular the specific inhibitor 3-cyclohexyl-5-(2,4-dihydroxybenzylidene)-1-methyl-2-thiohydantoin, for the treatment, therapy or prevention of neurological diseases, in particular Parkinson's diseases.

16 Claims, 15 Drawing Sheets

(56) References Cited

OTHER PUBLICATIONS

Bedard et al. "The NOX Family of ROS-Generating NADPH Oxidases: Physiology and Pathophysiology", Physiological Reviews, 87(1): 245-313, Jan. 2007.
Carroll "The Global Burden of Neurological Disorders", Neurology, 18: 2P., Published Online Mar. 14, 2019.
Chanteereau et al. "Design of Nonsteroidal Anti-Inflammatory Drug-Based Ionic Liquids with Improved Water Solubility and Drug Delivery", ACS Sustainable Chemistry & Engineering, 7(16)): 14126-14134, Jul. 17, 2019.
Choi et al. "NADPH Oxidase 1-Mediated Oxidative Stress Leads to Dopamine Neuron Death in Parkinson's Disease", Antidoxidants & Redox Signaling, 16(10): 1034-1045,, 2012.
Christovao et al. "Nox1/Nox4 Inhibitor Protects Dopaminergic Neurons from Degeneration: New Candidate for Parkinson Disease Therapeutic?", 1P.
Cristovao et al. "NADPH Oxidase 1 Mediates—Synucleinopathy in Parkinson's Disease", The Journal of Neuroscience, 32(42): 14465-14477, Oct. 17, 2012.
Cristovao et al. "The Role of NADPH Oxidase 1-Derived Reactive Oxygen Species in Paraquat-Mediated Dopaminergic Cell Death", Nitoxidants & Redox Signaling 11(9): 2105-2118, 2009.
Dorsey et al. "The Emerging Evidence of the Parkinson Pandemi", Journal of Parkinson's Disease 8(1): S3-S8, Dec. 18, 2018.
Egorova et al. "Biological Activity of Ionic Liquids and Their Application in Pharmaceutics and Medicine", Chemical Reviews, 117(10): 7132-7189, Jan. 26, 2017.
Hanslick et al. "Dimethyl Sulfoxide (DMSO) Produces Widespread Apoptosis in the Developing Central Nervous System", Neurobiology of Disease, 34(1): 1-10, Apr. 2009.
Parkinson "Parkinson's Disease Market: Pipeline Review, Developer Landscapeand Competitive Insights", Executive Summary, Research Methodology: 18P., 2002.
Pedro et al. "Ionic Liquids in Drug Delivery", Encyclopedia, 1(2), 324-339, Apr. 1, 2021.
Quental et al. "Enhanced Separation Performance of Aqueous Biphasic Systems formed by Carbohydrates and Tetralkylphosphonium- or Tetralkylammonium-Based Ionic Liquids", Green Chemistry, 20(13): 2978-2983, May 25, 2018.
Shamshina et al. "Develop Ionic Liquid Drugs", Nature, 528: 188-189, Dec. 10, 2015.
Sintra et al. "Enhancing the Antioxidant Characteristics of Phenolic Acids by their Conversion Into Cholinium Salts", ACS Sustain Chemistry & Engineering, 3(10): 2558-2565, Published Aug. 27, 2015.
Stolk et al. "Characteristics of the Inhibition of NADPH Oxidase Activation in Neutrophils by Apocynin, a Methoxy-substituted Catechol", American Journal of Respiratory Cell and Molecular Biology, 11(1): 95-102, Jul. 1994.
Tervo et al. A Structure-Activity Relationship Study of Catechol-0-Methyltransferase Inhibitors Combining Molecular Docking and 3D Qsar Methods, Journal of Computer-Aided Molecular Design 17: 797-810, XP009037832, 2003.
Yang et al. "Current and Projected Future Economic Burden of Parkinson's Disease in the U.S.", NPJ Parkinson's Disease, 6(1) : 1-10, Published Jul. 9, 2020.
Yuan et al. "Dimethyl Sulfoxide Damages Mitochondrial Integrity and Membrane Potential in Cultured Astrocyte", Plos One, 9(9,1 e1074): Sep. 1-9, 2014.

* cited by examiner

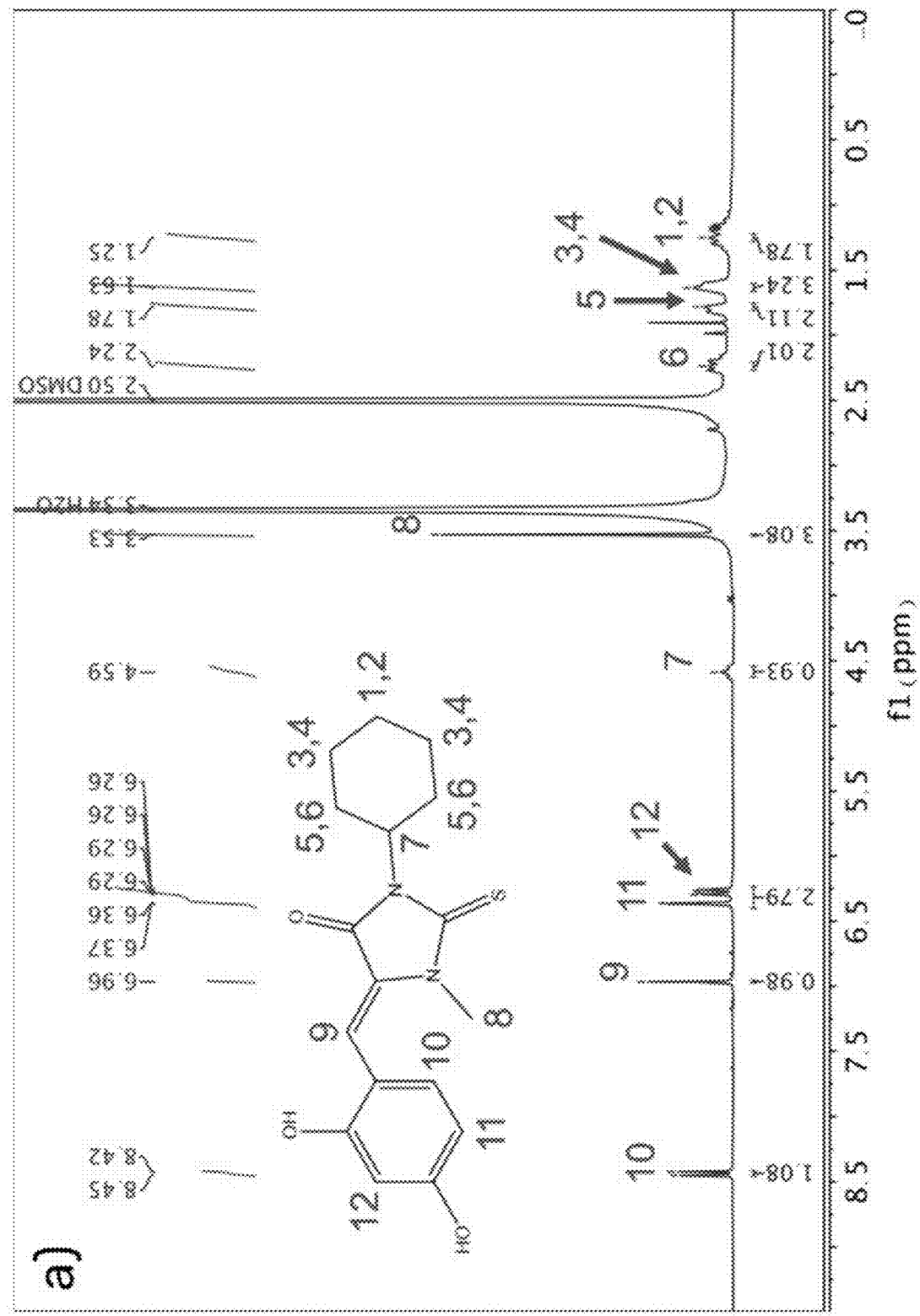
Fig. 1.a

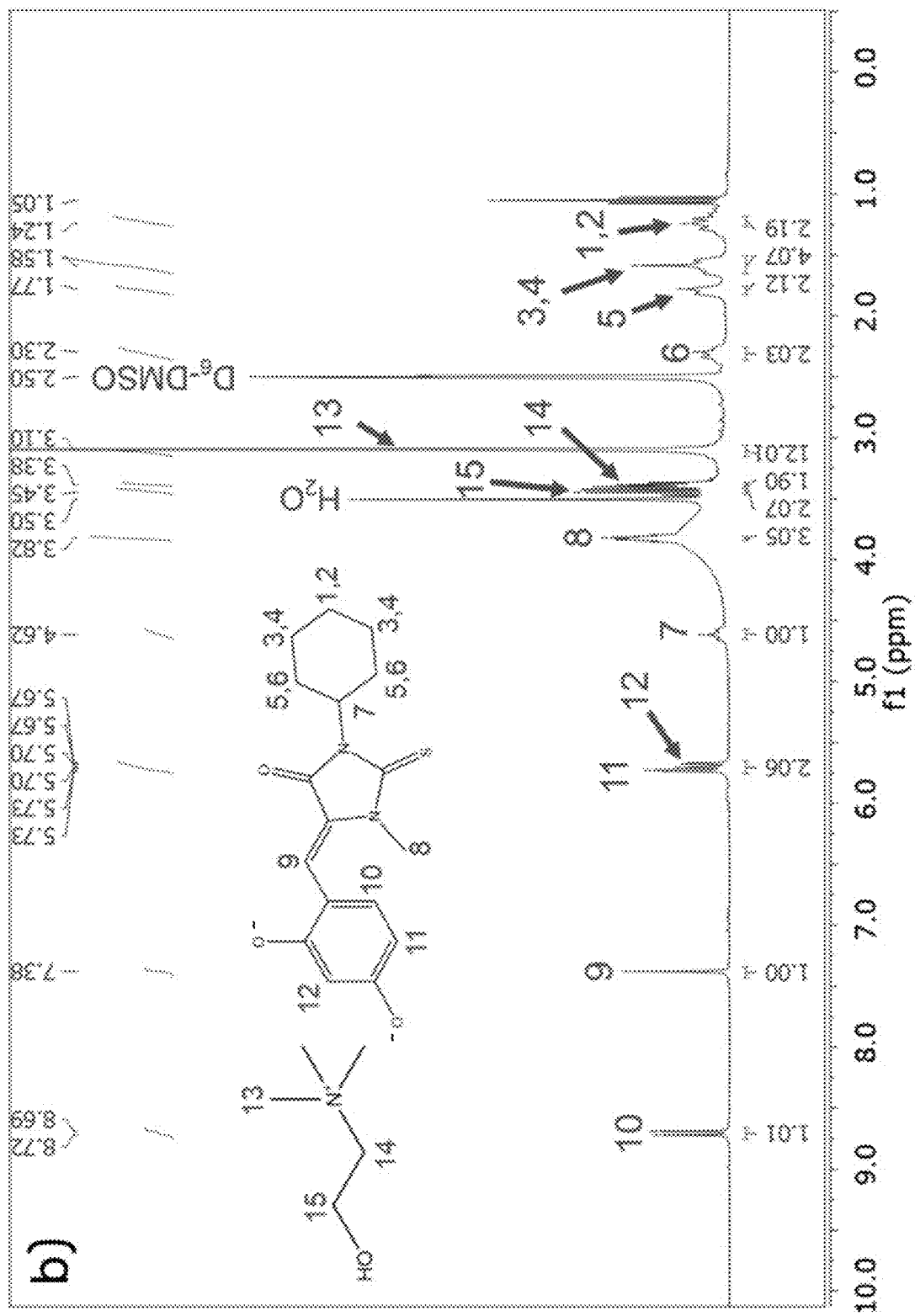
Fig. 1.b

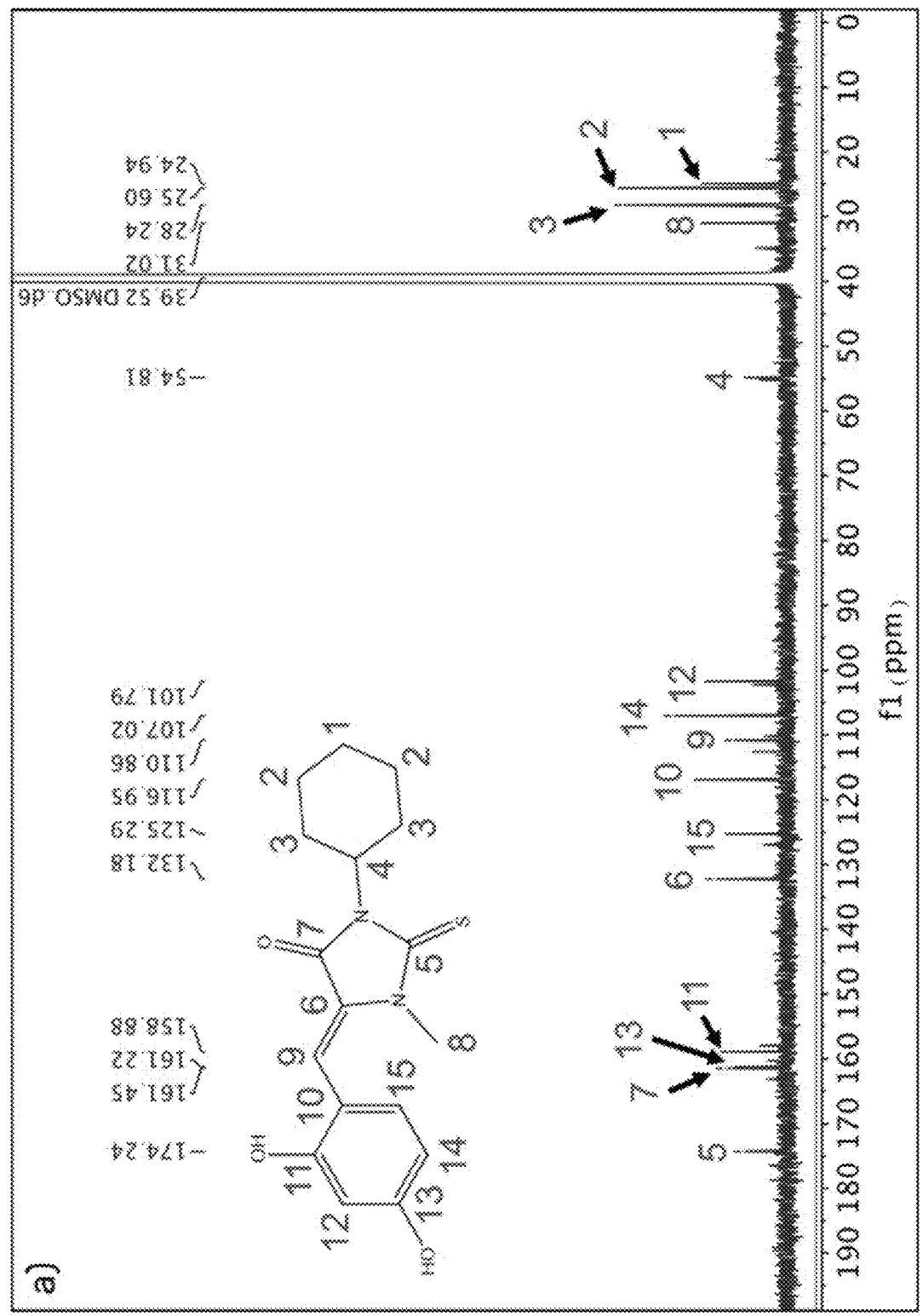
Fig. 2.a

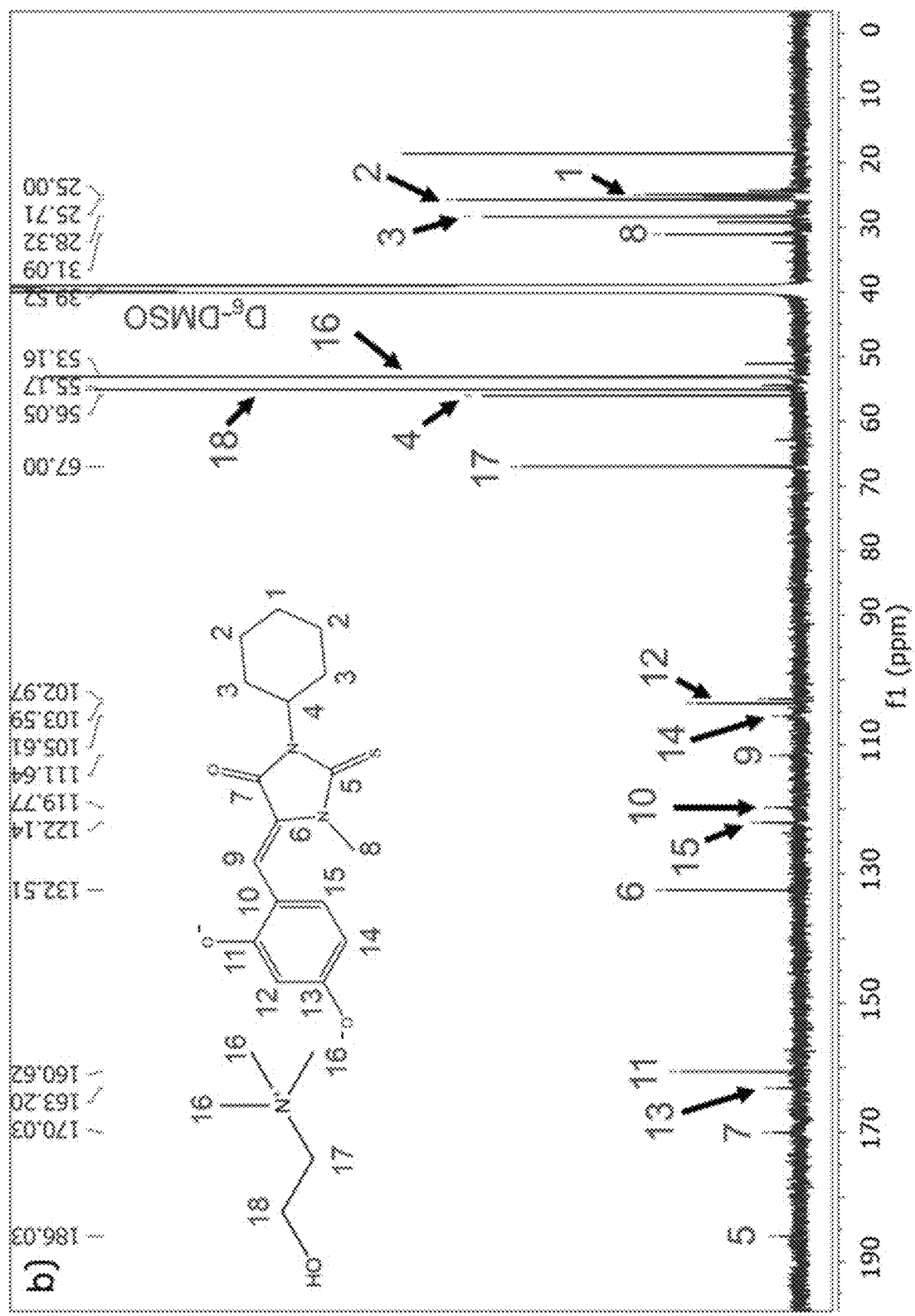
Fig. 2.b

IONIC-LIQUID-BASED FORMULATIONS FOR THE PREVENTION OR TREATMENT OF NEUROLOGICAL DISEASES

RELATED APPLICATIONS

This application is a National Phase of PCT Patent Application No. PCT/IB2023/050671 having International filing date of Jan. 26, 2023, which claims the benefit of priority of Portugal Patent Application No. 117761 filed on Jan. 26, 2022.

FIELD AND BACKGROUND OF THE INVENTION

The present disclosure relates to an ionic liquid (IL) formulation comprising inhibitors of NADPH oxidases enzymes (Nox's), preferably isoforms 1 and 4, in particular the specific inhibitor 3-cyclohexyl-5-(2,4-dihydroxybenzylidene)-1-methyl-2-thiohydantoin, for the treatment, therapy or prevention of neurological diseases, in particular Parkinson's diseases (PD).

Neurological disorders are the leading cause of disability and the second leading cause of death worldwide. According to the 2016 data from the Global Burden of Diseases, Injuries, and Risk Factors Study (GBD) published in the Journal Lancet Neurology (2019; 18 (5): 459-80), neurological disorders were the leading cause of disability-adjusted life-years-DALYs (276 million) and second leading cause of deaths (9.0 million).

Amongst the neurological disorders, Parkinson disease (PD) is the fastest growing one, with the number of people affected doubling to over 6 million from 1990 to 2015, according to the study by Dorsey et al. (Journal of Parkinson's Disease 2018; 8: S3-S8) entitled "The Emerging Evidence of the Parkinson Pandemic". The same study discloses that this number will further increase reaching over 12 million by 2040 due to the aging of the population. Furthermore, as highlighted by the same authors, the PD associated burden may increase to over 17 million by 2040, if other factors are considered (e.g. increasing longevity, declining smoking rates, and increasing industrialization). Therefore, the costs associated with PD are substantial.

According to a study by Yang et al. (Current and projected future economic burden of Parkinson's disease in the U.S. npj Parkinson's Disease 2020; 6 (1): 15), in 2017, in the United States alone, the total economic burden of PD was $51.9 billion, including direct medical costs of $25.4 billion and $26.5 billion in indirect and non-medical costs.

Currently, there is no cure for PD and the available therapies are symptomatic, only allowing the symptoms to be managed. The current scenario of PD therapies is largely based on the prescription of drugs, which act as dopamine precursors, dopamine agonists or agents with the aim of inhibiting key enzymes in the catabolic pathways of dopamine. However, the effectiveness of such therapies decreases over time as the disease progresses to more debilitating stages, rendering the patients with limited therapeutic options available. Therefore, the prevention of disease progression is increasingly being considered a promising solution for PD patients. Yet, the absence of preventive therapies to halt PD progression remains one of the prime unmet needs in this domain as highlighted by a market research study conducted by Research and Markets ("The Parkinson's Disease Market: Pipeline Review, Developer Landscape and Competitive Insights", pp. Report ID: 4586296). Accordingly, the development of preventive therapies for PD progression is essential.

In the central nervous system (CNS), oxidative stress is associated with several diseases and aging, being a strong contributor to Parkinson disease, and thus it might constitute a suitable target to halt the progression of neurological diseases.

Until recently, mitochondria were considered the main source of ROS in the CNS, but recent studies have revealed that the homologues of NADPH oxidase (Nox) enzymes are also located in the CNS, where they play a crucial role in the production of ROS, necessary for processes such as development, memory, neuronal signaling and vascular hemostasis. However, ROS produced by these enzymes are responsible for leading to cell death associated with the pathological processes of several neurological disorders, such as Parkinson's disease and amyotrophic lateral sclerosis (ALS). In this field, previous research has shown that Nox1-mediated oxidative stress have a crucial role in the degeneration of dopaminergic neurons in PD and the role of Nox's was validated in experimental models of PD (Cristovao et al. The role of NADPH oxidase 1-derived reactive oxygen species in paraquat-mediated dopaminergic cell death. Antioxidants & redox signaling 2009; 11:2105-2118; Choi et al. NADPH Oxidase 1-Mediated Oxidative Stress Leads to Dopamine Neuron Death in Parkinson's Disease. Antioxidants & redox signaling 2012; 16 (10): 1033-1045; Cristovao et al. NADPH oxidase 1 mediates alpha-synucleinopathy in Parkinson's disease. Journal of Neuroscience 2012; 32:14465-14477). These works have further demonstrated that it is possible to reduce the negative impact of oxidative stress produced by several isoforms of Nox's in neurons by using Apocynin (Apo), a non-specific inhibitor of Nox's. However, Apo is only soluble in dimethyl sulfoxide (DMSO), which in turn can induce direct or indirect neurotoxicity as previously demonstrated by Hanslick et al. (Dimethyl sulfoxide (DMSO) produces widespread apoptosis in the developing central nervous system; Neurobiology of Disease 2009; 34:1-10) and Yuan et al. (Dimethyl sulfoxide damages mitochondrial integrity and membrane potential in cultured astrocytes; PLOS One 2014; 9: e107447). Several antioxidant molecules or other chemical compounds capable of inhibiting Nox's share this problem of insolubility, influencing their therapeutic efficacy/application due to low bioavailability. This problem is also shared by other active pharmaceutical ingredients (API's) that are generally used in the solid state. API's in the solid state have recurrent problems of polymorphism and low solubility in water, deeply compromising their bioavailability and therapeutic efficiency, which according to the Tufts Center for the Study of Drug Development, is the main reason why drug-candidate molecules fail in phase 2 of clinical studies (Trial watch: Phase II failures: 2008-2010. Nature Reviews Drug Discovery 2011; 10:328-329). Furthermore, in the particular context of CNS-oriented drugs, their low ability to cross the blood brain barrier (BBB) is also a major problem. For this reason, the intranasal delivery route is becoming a route of strong interest in the delivery of medicines to the brain. Yet, this is not achievable with the traditional solid-state formulation of the majority of the drugs. Therefore, there is the need to develop new formulations that prevent the problems associated with polymorphism and low solubility of these drugs, while at the same time facilitate intranasal delivery in order to avoid concerns about BBB penetration, which are particularly relevant in the context of neurodegenerative diseases such as PD.

ILs are salts composed of an organic cation and an organic or inorganic anion. Due to the large size of the ions, these salts do not have an ordered crystalline structure and, as such, are liquid at temperatures lower than those of conventional salts are. A large fraction of known ILs are liquid at room temperature and body temperature, contributing to overcome the polymorphism scenario of most drugs and to improve the solubility of API's, since there is no need to overcome the energy associated with the melting enthalpy. In addition, because they are salts composed of ions, strong interactions with water are established, leading to a significant increase in their solubility. The development of ILs comprising APIs for pharmacological applications has already been suggested and is emerging as a new era for therapeutic strategies (Shamshina et al. Chemistry: Develop ionic liquid drugs. Nature 2015; 528:188-189; Egorova et al. Biological Activity of Ionic Liquids and Their Application in Pharmaceutics and Medicine. Chemical Reviews 2017; 117 (10): 7132-7189; Pedro et al. Ionic Liquids in Drug Delivery. Encyclopedia 2021; 1:324-339).

Previous works have successfully reported the conversion of different types of APIs into ILs, including antibiotics, analgesic and non-steroidal anti-inflammatory drugs (NSAIDS) (Pedro et al. Ionic Liquids in Drug Delivery. Encyclopedia 2021; 1:324-339).

The conversion of analgesic (lidocaine) and anti-inflammatory drugs (NSAIDs) into dual-function ILs allowed to increase their water solubility up to 470-fold without affecting their cytotoxic profile when compared with their analgesic and anti-inflammatory precursors (Abednejad et al. Polyvinylidene fluoride-Hyaluronic acid wound dressing comprised of ionic liquids for controlled drug delivery and dual therapeutic behavior. Acta Biomaterialia 2019; 100: 142-157). Likewise, the conversion of different NSAIDs into ILs, namely ibuprofen, ketoprofen, and(S)-naproxen, allowed to increase their bioavailability by improving their water solubility 100 times (Chantereau et al. Design of Nonsteroidal Anti-Inflammatory Drug-Based Ionic Liquids with Improved Water Solubility and Drug Delivery. ACS Sustainable Chemistry & Engineering 2019; 7:14126-14134).

Besides these APIs, phenolic antioxidants were already successfully converted into ILs. In the work "Enhancing the antioxidant characteristics of phenolic acids by their conversion into cholinium salts" (ACS Sustainable Chemistry & Engineering 2015; 3:2558-2565), five anions with antioxidant and anti-inflammatory characteristics, namely gallate, caffeate, vanillate, syringate, and ellagate, were conjugated with the cholinium cation. The obtained salts were significantly more soluble in water (ca. 3 orders of magnitude higher) than the corresponding phenolic acids. Furthermore, they generally presented higher antioxidant and anti-inflammatory activities, as well as comparable cytotoxicity and lower ecotoxicity profiles than their precursors.

Based on these promising results, as proof of concept of the idea behind this invention, the non-specific inhibitor of Nox's, Apocynin (Apo) was reformulated into cholinium apocynate ([Chol][Apo]) as disclosed in the work entitled "Testing the application of new antioxidant chemical formulations to prevent neuronal degeneration" (Afonso, 2017, MSC thesis, University of Beira Interior). The reformulated ionic liquid allowed overcoming the low solubility of Apo, with 50-fold increase in water solubility. The neuroprotective potential of the new formulation in the context of PD was further confirmed by the significant reduction in the 6OHDA-induced toxicity in dopaminergic neurons, in PD models. These encouraging results highlight the potential of the use of new IL-based pharmaceutical formulations in the context of neurodegenerative diseases, and in PD. However, Apo is a broad inhibitor of the NADPH oxidase enzymes being capable to inhibit several Nox isoforms by blocking the association of p47phox and p67phox with gp91phox (Stolk et al. Characteristics of the inhibition of NADPH oxidase activation in neutrophils by apocynin, a methoxy-substituted catechol. American Journal of Respiratory Cell and Molecular Biology 1994; 11:95-102). As it does not specifically inhibit one isoform, it is mostly used as NADPH oxidases inhibitor for research purposes (Bedard & Krause. The NOX family of ROS-generating NADPH oxidases: physiology and pathophysiology. Physiological Reviews 2007; 87:245-313). This lack of target specificity is a strong limitation of its use as a therapeutic approach, since it may lead to unwanted and non-controllable biological effects due to the inhibition of more than one Nox isoform, in different cell types, highlighting the necessity to develop specific Nox's inhibitors that exhibit high bioavailability and efficacy. Given the potential therapeutic role of targeting Nox's for several pathologies, the synthesis of specific inhibitors for those enzymes has attracted major attention. A previous work (Bae et al. Synthesis and biological evaluation of 3-substituted 5-benzylidene-1-methyl-2-thiohydantoins as potent NADPH oxidase (NOX) inhibitors, Bioorganic & Medicinal Chemistry 2016; 24:4144-4151) reported the formulation of several 3-substituted 5-benzylidene-1-methyl-2-thiohydantoin based compounds to inhibit Nox1(4). 3-cyclohexyl-5-(2,4-dihydroxybenzylidene)-1-methyl-2-thiohydantoin (N1(4)inh) demonstrated to be an effective inhibitor of Nox1 and partial inhibitor of Nox4 through lucigenin-based chemiluminescence assay in drosophila.

The knowledge previously generated with [Chol][Apo] served to build an irrefutable proof of concept on the application of ILs in the context of PD, allowing to extrapolate the approach for a Nox's specific inhibitor.

The Nox1(4) specific inhibitor 3-cyclohexyl-5-(2,4-dihydroxybenzylidene)-1-methyl-2-thiohydantoin (N1(4)inh) described in the publication "Synthesis and biological evaluation of 3-substituted 5-benzylidene-1-methyl-2-thiohydantoins as potent NADPH oxidase (NOX) inhibitors" (Bioorganic & Medicinal Chemistry 2016; 24:4144-4151) showed high neuroprotective potential in experimental models of PD (Cristóvão et al. Nox1/Nox4 inhibitor protects dopaminergic neurons from degeneration: new candidate for Parkinson disease therapeutic? 14th International Conference on Alzheimer's and Parkinson's Diseases and related neurological disorders AD/PD™ 2019). However, N1(4)inh is only soluble in a solvent composed of a buffer, ethanol and triton-X, which in itself has a cytotoxic effect on dopaminergic neurons, precluding the potential use of this highly promising inhibitor as future therapeutic strategy in the context of neurodegenerative diseases.

The identification of the problem described in the state of the art, as well as the approach taken to address it, illustrates well the problem that the present invention intends to solve.

The document KR20080051246 (A) "Pharmaceutical composition for prevention of treatment of neurodegenerative disease and inhibition of NADPH OXIDASE", refers to a NADPH oxidase inhibitor that comprises fluoxetine or norfluoxetine, capable to prevent the death of dopaminergic neurons through microglia reduced toxicity, being useful for prevention and treatment of neurodegenerative disease. This invention, despite being for the same target enzymes as in our invention, shows different formulations, since our inhibitor is an ionic liquid based on a 3-substituted 5-benzylidene-1-methyl-2-thiohydantoin.

The following set of documents, either by using chemical molecules or genes, have the goal to prevent or treat neurological disorders, through the modulation/inhibition of different pathological cellular mechanisms, including oxidative stress prevention, as our invention, however neither the pharmaceutical formulations nor the molecular targets are the same. For example: US2020289671 (A1)—Pharmaceutical Composition Comprising Aimp2-Dx2 For Preventing Or Treating Neuronal Diseases And Use Thereof; US2020385342 (A1)—Methods of Making Deuterium-Enriched N-acetylcysteine Amide (D-NACA) and (2R,2R')-3,3'-Disulfanediyl BIS(2-Acetamidopropanamide) (DI-NACA) and Using D-NACA and DINACA to Treat Diseases Involving Oxidative Stress; WO2018129421 (A1)—A Promising Drug Candidate For Parkinson's Disease; US2013109714 (A1)—Neurodegenerative Disease Therapeutic Agent.

The document CN111138376 (A)—3,5-Disubstituted Phenyl-1,2,4-Oxadiazole Derivative, And Preparation Method And Application Thereof discloses a 3,5-disubstituted phenyl-1,2,4-oxadiazole derivative, and a preparation method and an application thereof.

The documents: WO2020205937 (A1)—Hyaluronic Acid Nanoparticles Comprising NADPH Oxidases Inhibitors And Uses In Treating Cancer and US2019048001 (A1)—Iodonium Analogs As Inhibitors Of NADPH Oxidases And Other Flavin Dehydrogenases; Formulations Thereof; And Uses Thereof despite comprehending NADPH oxidases inhibitors, involve different formulations and applications. In these cases, the above-mentioned documents aim to inhibit NADPH oxidases using different API's, such as hyaluronic acid or iodonium analogues, which are use in cancer treatment. The document does not refer the use of our molecule or even the use in neurodegenerative diseases.

The documents appointed below describe diverse synthesis methods of different NADPH oxidase inhibitors, using either chemical or non-chemical methodologies, aiming to target a broad number of pathologies, such as metabolic and neurological disorders. Nevertheless, those inhibitors are different from our [Chol][N1(4)inh], both in terms of chemistry and formulation methods. Despite targeting NADPH oxidase enzymes, they diverge in terms of inhibitors, make use of different Nox's, have diverse applications and formulations when comparing to the present disclosure: for example US2020270214 (A1)—NADPH Oxidase Inhibitors and Uses Thereof; JP2020063283 (A)—Nox Inhibitor And NfκB Inhibitor Including Methoxy Flavone; KR20200022193 (A)—Pharmaceutical composition for preventing or treating tuberculous pleural fibrosis, comprehending a different NOX.

The document SG10201808940W (A)—NOX Inhibitor And NFκB Inhibitor Containing Methoxyflavone aims at providing NOX inhibitors and NFκB inhibitors having superior actions, as well as agents for preventing or treating Nox- or NFicB-associated diseases that utilize such inhibitors. To this end, specified methoxyflavones are employed.

The documents below disclose IL-based formulations to target PD: MX2016011152 (A)—Pramipexole-Containing Transdermal Patch For Treatment Of Neurodegenerative Disease, which discloses a different compound when compared to our disclosure and is not targeted to NOX's; and WO2010078258 (A1)—Compounds Comprising Two Or More Biologically Functional Ions And Method Of Treating Parkinson's Disease, which comprises an active compound totally different and with completely different therapeutic target from the one used in our disclosure. The APIs used in the ILs of the document WO2010078258 (A1) are 2-(diethylamino)-JV-(2,6-dimethylphenyl) acetamide (lidocaine), (2S,3S)-5-[2-(dimethylamino)ethyl]-2-(4-methoxyphenyl)-oxo-2,3,4,5-tetrahydrobenzo[b][1,4]thiazepin-3-yl acetate, 2-(2,6-dichloro-3-methylphenylamino)benzoic acid (meclofenamate), 5-ethyl-8-oxo-5,8-dihydro-[1,3]dioxolo[4,5-g]quinoline-7-carboxylic acid (oxolinate), and (2S,5R,6R)-6-((R)-2-amino-2-phenylacetamido)-3,3-dimethyl-7-oxo-4-thia-1-azabicyclo[3.2.0]heptane-2-carboxylic acid (ampicillinate); while ours is the 3-substituted 5-benzylidene-1-methyl-2-thiohydantoin. Furthermore, our IL and formulation target specifically Nox1 and Nox4 isoforms.

The known solutions in the state of the art illustrate the technical problem to be solved by the present disclosure.

These facts are disclosed in order to illustrate the technical problem addressed by the present disclosure.

SUMMARY OF THE INVENTION

The present disclosure concerns the development of a new IL-based formulation of specific NOX's inhibitors. Their negligible solubility in aqueous solvents is a problem shared by several compounds capable of inhibiting Nox's, and this poor solubility negatively affects their bioavailability, reducing their efficacy and therapeutic potential. The present disclosure contemplates the development of a non-toxic alternative formulation that allows improved solubilization of Nox inhibitors in aqueous solutions, and thus improve bioavailability, efficacy and therapeutic potential. One of the objectives of the present disclosure is to increase the solubility and consequent bioavailability and efficacy of a specific Nox inhibitor for application to neurological diseases.

In view of the drawbacks to the prior art, the technical problem underlying the invention was to develop, an IL-based formulation of N1(4)inh for application to neurological diseases, in particular for the use in the prevention, therapy to slow-down disease progression or treatment of Parkinson's diseases (PD).

Since Nox's are ideal targets for specific antioxidant therapeutic strategies, the present disclosure is useful for the development of a new therapeutic approach that aims to reduce/halt neurodegenerative diseases progression over time, including PD.

In an embodiment, the new IL formulation of N1(4)inh was developed using the following methodologies: (1) Synthesis and chemical characterization of the specific inhibitor 3-cyclohexyl-5-(2,4-dihydroxybenzylidene)-1-methyl-2-thiohydantoin (N1 (4)inh) into an IL-based formulation, namely cholinium 3-cyclohexyl-5-(2,4-dihydroxybenzylidene)-1-methyl-2-thiohydantonate ([Chol][N1(4)inh]+N1(4)inh) and (2) evaluation of its biological effect in dopaminergic neurons in vitro.

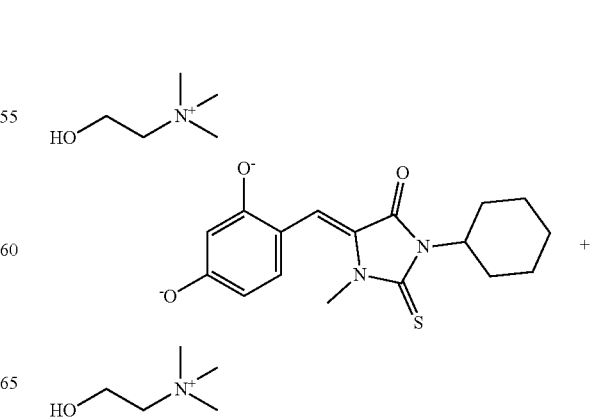

-continued

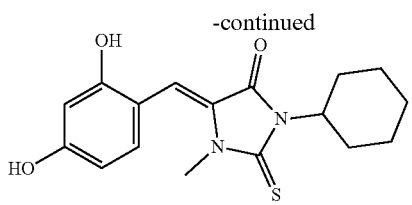

In an embodiment, the IL formulation of the inhibitor when compared with non-reformulated inhibitor (precursor), showed higher solubility, no neuronal toxicity, and a high neuroprotective potential in the context of PD. Thus, the compounds and formulation of the present disclosure overcome the problems of solubility of Nox's inhibitors in aqueous solvents, thus increasing their potential as neuroprotective therapies to slowdown PD progression, representing relevant advances in the field of specific antioxidant therapy.

One aspect of the present disclosure relates to Nox's specific inhibitors into ILs and formulations, as well as by its therapeutic application to neurological diseases, namely PD.

In an embodiment, the inhibitor disclosed in the present disclosure is specific for isoform 1 and 4 of the NADPH oxidase enzymes. So, the present disclosure relates to a new pharmaceutical formulation to specifically target NADPH oxidase 1 and 4 by inhibition, to be used to tackle neurological disorders, namely to reduce/halt PD progression after it is diagnosed.

One aspect of the present disclosure relates to ionic liquid comprising the anion of formula

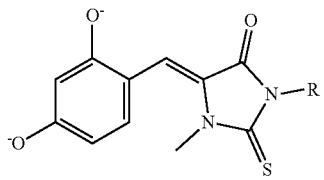

wherein R is an alkyl group, or a cyclo alkyl group; and a cation selected from a list consisting of: cholinium, tetraalkylammonium, tetraalkylphosphonium, or 1-alkyl-3-methylimidazolium cation families.

In an embodiment, the molar ratio of the anion and the cation ranges from 1:2 to 2:1 (mol:mol); preferably 1:1.5 to 1.5:1 (mol:mol).

In an embodiment, the molar ratio of the anion and the cation is 1:1 (mol:mol).

In an embodiment, R is a cyclo alkyl group from C3-C7.

In an embodiment, R is an unsubstituted cycloalkyl group from C3-C7.

In an embodiment, R is a cyclohexyl group.

In an embodiment, the cation is cholinium.

In an embodiment, the compound is 3-substituted 5-benzylidene-1-methyl-2-thiohydantoin or 3-cyclohexil-5-(2,4-dihydroxybenzylidene)-1-methil-2-thiohidantoin.

Another aspect of the present disclosure relates to the use of the ionic salt of the present disclosure, preferably an ionic liquid and formulation in medicine or as medicament.

In an embodiment, the ionic liquid of the present disclosure, preferably an ionic liquid and formulation, may be used in the prevention or treatment of a disease, disorder or condition of the central nervous system.

In an embodiment, the ionic liquid and formulation of the present disclosure, may be for use in the prevention or treatment of neurodegeneration, cognitive dysfunction, dementia, or multiple system atrophy.

In an embodiment, the ionic liquid and formulation of the present disclosure, preferably an ionic liquid and formulation, may be used in the prevention or treatment of Parkinson's disease.

In an embodiment, the ionic liquid and formulation of the present disclosure, may be use in the slowing-down or retard progression of Parkinson's Disease.

Another aspect of the present disclosure relates to a pharmaceutical composition comprising a therapeutically effective amount of the ionic liquid of the present disclosure and a pharmaceutically acceptable carrier.

In an embodiment, the pharmaceutically acceptable carrier is saline buffer, PBS, water or mixtures thereof.

In an embodiment, an amount of the ionic liquid ranges from 0.005 mM-10 mM, preferably 0.1-5 mM; more preferably 1-2 mM.

In an embodiment, the composition is an injectable form, an intranasal administration form, an intrathecal form or a brain intraventricle form; preferably, the composition is an intranasal form, a brain intraventricle form or an intrathecal administration form.

In an embodiment, the composition comprises the administration of a daily dosage to a person with a neurodegenerative disease or disorder of the central nervous system, preferably during not less then 30 days. In an embodiment, the dosage amount is less than 1000 mg/day, preferably ranging from 0.05-1000 mg/day, more preferably ranging from 0.05-5 mg/day, in particular by intranasal form or an intrathecal (brain intraventricle).

In an embodiment, the daily form consists of a tablet, suppository, ampoule or intranasal form or an intrathecal, comprising a pharmaceutical effective amount of the composition of the present disclosure, the whole of which is intended to be administered as a single dose in a daily regimen.

The present disclosure also refers to the development of a new formulation of a specific inhibitor of Nox1 and Nox4 (N1(4)inh), comprising the following steps:
1) Conversion of the specific inhibitor [N1(4)inh] into an IL-based formulation, namely a mixture (1:1) of cholinium 3-cyclohexyl-5-(2,4-dihydroxybenzylidene)-1-methyl-2-thiohydantonate and 3-cyclohexyl-5-(2,4-dihydroxybenzylidene)-1-methyl-2-thiohydantonate ([Chol]$_2$[N1(4)inh]+N1(4)inh, 1:1), comprehending the following procedure:
   1a) Selection of IL anions and cations.
   1b) Synthesis of [Chol]$_2$[N1(4)inh] by metathesis reaction using a cholinium salt as the cation source and 3-cyclohexyl-5-(2,4-dihydroxybenzylidene)-1-methyl-2-thiohydantoin (N1(4)inh) as the anion source.
   1c) Characterization of [Chol]$_2$[N1(4)inh]+N1(4)inh and N1(4)inh purity by Nuclear Magnetic Resonance ($^1$H NMR and $^{13}$C NMR); solubility in water and in phosphate buffered saline (PBS) solution; and thermal stability by thermogravimetric analysis (TGA).
2) Evaluation of the biological effect of [Chol]$_2$[N1(4)inh]+N1(4)inh in dopaminergic neurons in vitro and in vivo, by means of:
   2a) Evaluation of [Chol]$_2$[N1(4)inh]+N1(4)inh cytotoxicity in immortalized rat dopaminergic neural cell line (N27).

2b) Evaluation of the reformulation's biological effect in the context of a therapy for PD, by assessing its dopaminergic neuroprotective capacity in PD in vitro models.

2c) Evaluation of [Chol]$_2$[N1(4)inh]+N1(4)inh neuronal dopaminergic toxicity in the subtantia nigra of mice.

2d) Evaluation of [Chol]$_2$[N1(4)inh]+N1(4)inh toxicity in mice and rats.

2e) Evaluation of the reformulation's biological effect in the context of a therapy for PD, by assessing its dopaminergic neuroprotective effect and its capacity to prevent the progression of motor dysfunction in in vivo models of PD.

In an embodiment, considering the pathological role of oxidative stress originated from Nox's enzymes in PD and other neurological diseases, the use of inhibitors of the activity of these enzymes plays a major role in the development of future therapies that aim to reduce the speed of progression and disability of this disease over time. However, most, if not all of these inhibitors, present negligible solubility in aqueous solutions, and as such a reduced efficacy due to low bioavailability, and also the need to use organic solvents as vehicles, which in turn have a high cytotoxic impact. In addition, the reformulation of these inhibitors into liquid compounds is crucial for intranasal administration and circumvent the high selectivity of the blood brain barrier (BBB), allowing their concentration in the brain (target organ).

The present disclosure also concerns the development of a new IL-based formulation of inhibitors of NADPH oxidases enzymes (Nox's), in particular of an inhibitor specific for Nox1 and Nox 4 (Nox1(4)), to be used as therapeutic agent in neurological diseases and in particular in Parkinson's disease.

The present disclosure also relates the new IL-based formulation of the specific inhibitor of Nox1(4), comprises the following steps:

1) Conversion of N1(4)inh into an IL-based formulation, namely cholinium 3-cyclohexyl-5-(2,4-dihydroxybenzylidene)-1-methyl-2-thiohydantonate and 3-cyclohexyl-5-(2,4-dihydroxybenzylidene)-1-methyl-2-thiohydantonate [Chol]$_2$[N1(4)inh]+N1(4)inh), comprehending the procedures of:
   1a) Selection of IL anions and cations.
   1b) Synthesis of [Chol]$_2$[N1(4)inh].
   1c) Chemical characterization of [Chol]$_2$[N1(4)inh]+N1(4)inh and N1(4)inh, namely purity, solubility and thermal stability.

2) Evaluation of the biological effect of [Chol]$_2$[N1(4)inh]+N1(4)inh in dopaminergic neurons, in vitro and in vivo, including:
   2a) Evaluation of the cytotoxicity of [Chol]$_2$[N1(4)inh]+N1(4)inh in immortalized rat dopaminergic neural cell line (N27).
   2b) Verification of the reformulation's biological effect in the context of a therapy for PD, evaluating its dopaminergic neuroprotective capacity in PD in vitro models.
   2c) Evaluation of [Chol]$_2$[N1(4)inh]+N1(4)inh neuronal dopaminergic toxicity in the subtantia nigra (SN) of mice.
   2d) Evaluation of [Chol]$_2$[N1(4)inh]+N1(4)inh toxicity in mice and rats.
   2e) Evaluation of the reformulation's biological effect in the context of a therapy for PD, by assessing its dopaminergic neuroprotective effect and its capacity to prevent the progression of motor dysfunction in in vivo models of PD.

In an embodiment, concerning the first part of the method a cholinium salt was used as the cation source and 3-cyclohexil-5-(2,4-dihydroxybenzylidene)-1-methil-2-thiohidantoin (N1(4)inh) as the anion source. [Chol]$_2$[N1(4)inh]+N1(4)inh was synthesized by metathesis reaction and was characterized in terms of purity, thermal stability and solubility. The purity of [Chol]$_2$[N1(4)inh]+N1(4)inh and N1(4)inh was confirmed by $^1$H and $^{13}$C NMR (FIGS. 1-2). The solubility results disclose that [Chol]$_2$[N1(4)inh]+N1(4)inh is more soluble in water and in PBS than its precursor alone—N1(4)inh (FIGS. 3-4). The thermal stability results demonstrate that under the specified conditions, the formulation has a decomposition temperature of 200° C. (FIG. 5). At room temperature (ca. 23° C.) the IL-based formulation is a highly viscous liquid, meaning that its melting temperature is below room temperature. The IL-based formulation thus not exhibits a well-ordered crystalline structure, allowing overcoming the problems associated with polymorphism of solid-state formulations.

In an embodiment, regarding the evaluation of the biological effect of [Chol]$_2$[N1(4)inh]+N1(4)inh, the obtained results disclose that the reformulation of the specific Nox1(4)inhibitor into [Chol]$_2$[N1(4)inh]+N1(4)inh does not induce changes in the viability of the dopaminergic neuronal line N27 cells, demonstrating no cytotoxic potential towards these cells (FIG. 6). Regarding its dopaminergic neuroprotective capacity, pretreatment of N27 cells with [Chol]$_2$[N1(4)inh]+N1(4)inh significantly prevents the neurotoxic effect of 6OHDA, a neuroprotective effect that was not promoted by the pretreatment with cholinium, the cation used to synthetize [Chol]$_2$[N1(4)inh]+N1(4)inh (FIG. 7). In addition, pretreatment of N27 cells with [Chol]$_2$[N1(4)inh]+N1(4)inh is also capable of significantly preventing the neurotoxic effect of MPP+ toxin, a neuroprotective effect that has not been promoted by pretreatment with cholinium chloride (FIG. 8). Since 6OHDA and MPP+ induce their dopaminergic neuronal toxicity by inducing different intracellular pathological mechanisms, these latter results are indicators that [Chol]$_2$[N1(4)inh]+N1(4)inh is capable of modulating two different pathological mechanisms, as it can prevent neuronal death induced by two different toxins. These data are important since the goal is to use [Chol]$_2$[N1(4)inh]+N1(4)inh as therapy to halt the progression of a multifactorial disease in terms of pathological mechanisms.

In an embodiment, the dopaminergic neuroprotective capacity of [Chol]$_2$[N1(4)inh]+N1(4)inh in an animal model of PD induced by intrastriatal injection of 10 μg of 6OHDA was evaluated. As shown in FIG. 9, the infusion of 0.2 mg/kg/day of [Chol]$_2$[N1(4)inh]+N1(4)inh into the right ventricle for 7 days did not induced dopaminergic neuronal toxicity in the SN of mice. Moreover, this dose of [Chol]$_2$[N1(4)inh]+N1(4)inh was capable of preventing 6OHDA-induced degeneration of dopaminergic neurons in the SN (FIG. 10).

In an embodiment, the toxicity of [Chol]$_2$[N1(4)inh]+N1(4)inh when administrated via intranasal route in mice was evaluated. These administrations did not induced toxic effect in mice. As it is shown in FIGS. 11 and 12, the daily intranasal administration of different doses of the IL-based formulation during 14 days, did not induces changes in animals weight (FIG. 11) nor changes in motor performance (FIG. 12). Moreover, the daily administration of the higher dose tested (0.16 mg/kg/day), did not induced olfactory dysfunction, as shown in FIG. 13.

In an embodiment, the toxicity of [Chol]$_2$[N1(4)inh]+N1(4)inh when administered in rats via brain intra-ventricle route was evaluated. No toxic effect were observed in rats exposed to 0.007 mg/kg/day. As shown in FIGS. 14 and 15, no changes in animals weight nor in motor performance, respectively, were observed.

In an embodiment, the toxicity of [Chol]$_2$[N1(4)inh]+N1(4)inh when administered via intranasal route in rats was evaluated. These administrations did not induced toxic effect in rats. As it is shown in FIGS. 16 and 17, the daily intranasal administration of 0.062 mg/kg/day of the IL-based formulation during 30 days, did not induces changes in animals weight (FIG. 16) nor changes in motor performance (FIG. 17). Moreover, the daily administration of [Chol]$_2$[N1(4)inh]+N1(4)inh did not induced olfactory dysfunction, as shown in FIG. 18.

In an embodiment, the neuroprotective effect of [Chol]$_2$[N1(4)inh]+N1(4)inh capable to prevent motor dysfunction in PD context was evaluated when administered via brain intra-ventricle route, in an animal model of PD induced by the long term exposure of rats to a low dose (2.5 mg/kg/day) of paraquat (PQ). The infusion of 0.007 mg/kg/day of [Chol]$_2$[N1(4)inh]+N1(4)inh into the right ventricle for 30 days was capable of prevent the progression of motor performance dysfunction induced by PQ (FIGS. 19, 20 and 21).

In an embodiment, the neuroprotective effect of [Chol]$_2$[N1(4)inh]+N1(4)inh capable to prevent motor dysfunction in PD context was evaluated when administered via intra-nasal route, in an animal model of PD induced by the long term exposure of rats to a low dose (2.5 mg/kg/day) of paraquat (PQ). The administration of 0.062 mg/kg/day of [Chol]$_2$[N1(4)inh]+N1(4)inh for 30 days was capable of prevent the progression of motor performance dysfunction induced by PQ (FIG. 22).

These results are a good indication that a new formulation of Nox inhibitors into IL-based formulations can be used as a new therapeutic approach to PD or other neurological pathologies, and that [Chol]$_2$[N1(4)inh]+N1(4)inh can be used as a new therapeutic approach to PD or other neurological pathologies in which these enzymes play an important pathological role.

BRIEF DESCRIPTION OF THE SEVERAL VIEWS OF THE DRAWINGS

The following figures provide preferred embodiments for illustrating the disclosure and should not be seen as limiting the scope of invention.

FIG. 1 shows $^1$H NMR spectra of: a) the Specific Nox1(4)inhibitor (N1(4)inh) and b) the IL formulation of the Specific Nox1(4)inhibitor ([Chol]$_2$[N1(4)inh]+N1(4)inh).

FIG. 2 shows $^{13}$C NMR spectra of: a) the Specific Nox1(4)inhibitor (N1(4)inh) and b) the IL formulation of the Specific Nox1(4)inhibitor ([Chol]$_2$[N1(4)inh]+N1(4)inh).

DESCRIPTION OF SPECIFIC EMBODIMENTS OF THE INVENTION

Figure 3:
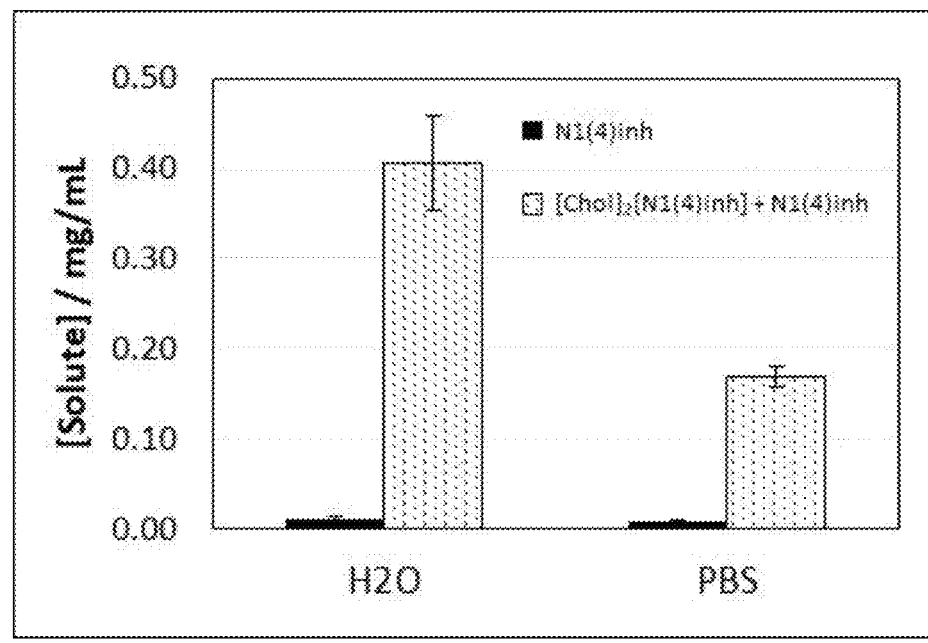
FIG. 3 shows the solubility in water and PBS of the Nox1(4)inhibitor N1(4)inh versus its IL-based formulation ([Chol]$_2$[N1(4)inh]+N1(4)inh) in mg/mL.

The present disclosure relates to the development of an IL-based formulation of a specific inhibitor of the NADPH oxidases enzymes (Nox's), particularly Nox1 and Nox4 for therapeutic application in Parkinson's disease (PD) or other neurological diseases. The strategy used consists on the conversion of Nox1(4)-specific inhibitor 3-cyclohexyl-5-(2,4-dihydroxybenzylidene)-1-methyl-2-thiohydantoin (N1(4)inh) into a formulation comprising cholinium 3-cyclohexyl-5-(2,4-dihydroxybenzylidene)-1-methyl-2-thiohydantonate and 3-cyclohexyl-5-(2,4-dihydroxybenzylidene)-1-methyl-2-thiohydantonate ([Chol]$_2$[N1(4)inh]+N1(4)inh, 1:1).

The present disclosure refers to the conversion of the Nox1(4) specific inhibitor into an IL-based formulation, [Chol]$_2$[N1(4)inh+N1(4)inh, to be used in the context of PD and other neurological diseases and comprises the following steps: (1) Conversion of the specific inhibitor N1(4)inh into an IL-based formulation, namely cholinium 3-cyclohexyl-5-(2,4-dihydroxybenzylidene)-1-methyl-2-thiohydantonate and 3-cyclohexyl-5-(2,4-dihydroxybenzylidene)-1-methyl-2-thiohydantonate ([Chol]$_2$[N1(4)inh]+N1(4)inh, 1:1, mol:mol), comprehending the following procedure: a) Selection of the IL cation source and selection of the anion source; b) Synthesis of [Chol]$_2$[N1(4)inh] by metathesis reaction using a cholinium salt as the cation source and 3-cyclohexyl-5-(2,4-dihydroxybenzylidene)-1-methyl-2-thiohydantoin (N1(4)inh) as the anion source; c) Characterization of [Chol]$_2$[N1(4)inh]+N1(4)inh and N1(4)inh purity by Nuclear Magnetic Resonance ($^1$H NMR and $^{13}$C NMR); d) Determination of [Chol]$_2$[N1(4)inh]+N1(4)inh solubility in water and PBS; e) Characterization of [Chol]$_2$[N1(4)inh]+N1(4)inh thermal stability by thermogravimetric analysis (TGA). (2) Evaluation of the biological effect of [Chol]$_2$[N1(4)inh]+N1(4)inh in dopaminergic neurons in vitro, by means of: a) Evaluation of [Chol]$_2$[N1(4)inh]+N1(4)inh cytotoxicity in immortalized rat dopaminergic neural cell line (N27); b) Evaluation of the reformulation's biological effect in the context of a therapy for PD, by assessing its dopaminergic neuroprotective capacity in PD in vitro models.

Unless otherwise stated, the [Chol]$_2$[N1(4)inh]+N1(4)inh mixture used in the examples of the present disclosure were in the proportion 1:1 (mol:mol) (Chol]2[N1(4)inh]:N1(4)inh).

In the present disclosure, [Chol]$_2$[N1(4)inh]+N1(4)inh can also be called [Chol]$_2$[N1(4)inh]+Nox1(4)inh or [Chol]$_2$[N1(4)inh]+Nox1(4).

Conversion of the specific inhibitor N1(4)inh into an IL-based formulation:

In an embodiment, the synthesis of the IL-based formulation starts with the selection of the components, i.e., the cation source and the anion source.

In an embodiment, the cation source should belong to the class of cholinium salts, preferably cholinium bicarbonate.

In an embodiment, the anion source should belong to the group of 3-substituted 5-benzylidene-1-methyl-2-thiohydantoin based compounds, preferably it should be 3-cyclohexil-5-(2,4-dihydroxybenzylidene)-1-methil-2-thiohidantoin (N1(4)inh).

In an embodiment, the IL-based formulation ([Chol]$_2$[N1(4)inh]+N1(4)inh) was synthesized by metathesis reaction with 1:1 mole ratio of cholinium bicarbonate (80% (m/v) in water) and N1(4)inh solution prepared in a minimum amount of absolute ethanol.

In an embodiment, the N1(4)inh was mixed by drop-wise addition into cholinium bicarbonate solution under dark and cold conditions (using an ice-bath at ~5° C.) and with continuous stirring.

In an embodiment, the reaction mixture was further kept at ~5° C. under continuous stirring for 2 h.

In an embodiment, the excess solvent and water were removed under continuous flow of nitrogen gas until complete drying (~2-3 h of nitrogen gas flow with the IL containing vial maintained in an ice-cold water bath (~10° C.)).

In an embodiment, the mixture comprising the synthesized [Chol]$_2$[N1(4)inh] and N1(4)inh was finally collected from the ice-cold water bath and stored under dried, cool and dark conditions.

In an embodiment, the purity of the [Chol]$_2$[N1(4)inh] and N1(4)inh was evaluated by means of $^1$H NMR and $^{13}$C NMR as disclosed in FIG. 1 and FIG. 2, respectively.

In an embodiment, the obtained NMR spectra allowed to confirm that the [Chol]$_2$[N1(4)inh]+N1(4)inh was successfully synthetized and that it is pure.

In an embodiment, the [Chol]$_2$[N1(4)inh]+N1(4)inh solubility in water and phosphate buffered saline (PBS) solution were determined.

In an embodiment, the solutes N1(4)inh and mixture comprising [Chol]2[N1(4)inh]+N1(4)inh were added in excess to a fixed volume (500 μL) of water and PBS solution. These mixtures were incubated at 37° C., under constant agitation 1150 rpm and for a minimum of 72 h, using an Eppendorf Thermomixer Comfort equipment. Throughout this process, solute was added to the mixture, whenever necessary, i.e., until the solution saturation. All samples were filtered using syringe filters (0.45 mm) to remove possible suspended solid particles.

In an embodiment, the quantification of N1(4)inh and [Chol]$_2$[N1(4)inh] was carried by UV-spectroscopy, using a UV-spectrophotometry (SYNERGY|HT microplate reader, BioTek) at a wavelength of 416 nm and 480 nm, respectively. The interference of the PBS with the quantification method was also ascertained and blank control samples were always used.

Figure 4:
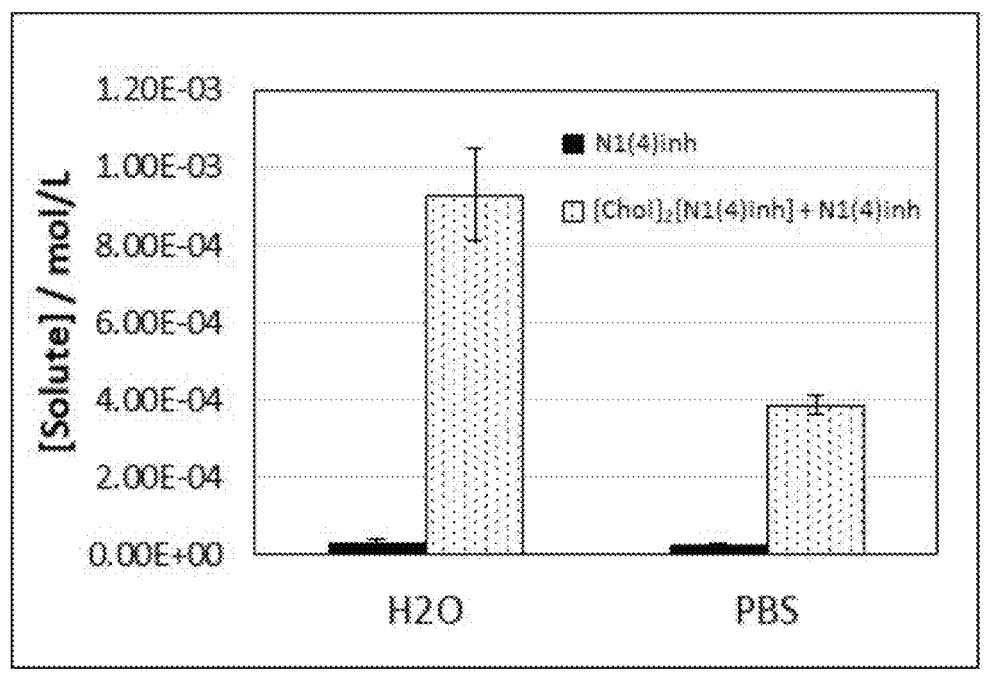
FIG. 4 shows the solubility in water and PBS of the Nox1(4)inhibitor N1(4)inh versus its ionic-liquid-based formulation ([Chol]$_2$[N1(4)inh]+N1(4)inh) in mol/L.

In an embodiment, the solubility of the mixture [Chol]$_2$[N1(4)inh]+N1(4)inh in water was 0.405±0.053 mg/mL, which is 36 higher than N1(4)inh alone (0.011±0.002 mg/mL). An increase in the IL-based formulation solubility was also noticeable in PBS, with a 21 fold increase (from 0.008±0.001 mg/ml to 0.168±0.002 mg/mL) (FIG. 3). Similar results were obtained for increases in solubility provided in mol/L (FIG. 4).

These results clearly demonstrate that the reformulation of N1(4)inh into [Chol]$_2$[N1(4)inh]+N1(4)inh allows to overcome one of the most important problems associated with Nox's specific inhibitors, i.e. low solubility, reinforcing the potential of this new reformulation to be used in the context of PD and other neurological diseases.

Figure 5:
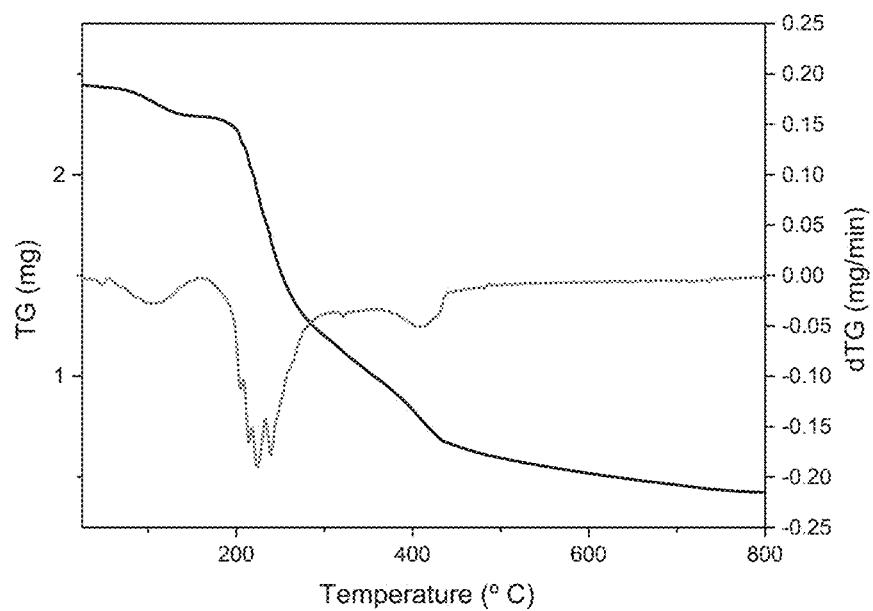
FIG. 5 shows decomposition temperature of [Chol]$_2$[N1(4)inh]+N1(4)inh assessed by thermogravimetric analysis (TGA).

In an embodiment, the decomposition temperature of [Chol]$_2$[N1(4)inh]+N1(4)inh was evaluated by thermogravimetric analysis (TGA) and the results disclose that the mixture is thermally stable up to 200° C., as disclosed in FIG. 5.

(2) Evaluation of the Biological Effect of [Chol]$_2$[N1(4) Inh]+N1(4)Inh in Dopaminergic Neurons In Vitro.

In an embodiment, the cytotoxicity of [Chol]$_2$[N1(4)inh]+N1(4)inh in Immortalized rat dopaminergic neural cell line (N27) was evaluated.

The cells were exposed to 20 and 30 µM of [Chol]$_2$[N1(4)inh]+N1(4)inh, or to 20 µM of cholinium chloride. Cholinium chloride was solubilized in saline and [Chol]$_2$[N1(4)inh]+N1(4)inh was solubilized in PBS 1× (Phosphate-saline buffer).

The cells were kept for 24 h under the stimulus and cell viability was evaluated using the CCK-8 kit (Cell Counting Kit-CCK-8; Dojindo Molecular Technologies).

Figure 6:
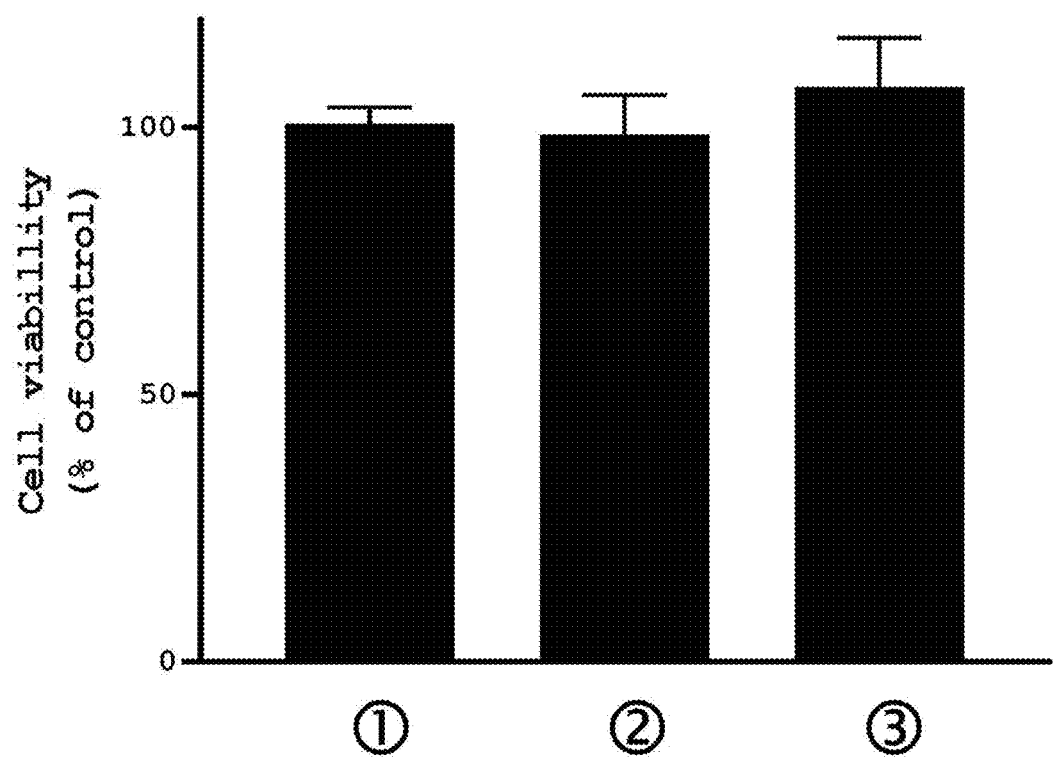
FIG. 6 shows the effects of two concentration of [Chol]$_2$[N1(4)inh]+N1(4)inh on the viability of N27 dopaminergic neuronal cells. (1) Untreated cells; (2) Cells exposed to 20 µM of [Chol]$_2$[N1(4)inh]+N1(4)inh; (3) Cells exposed to 30 µM of [Chol]$_2$[N1(4)inh]+N1(4)inh.

[Chol]$_2$[N1(4)inh]+N1(4)inh did not exert a toxic effect on N27 dopaminergic cells when exposed to 20 or 30 µM of the mixture, since no statistically significant differences were observed between cell viability values in cultures exposed to [Chol]$_2$[N1(4)inh]+N1(4)inh (20 µM ②) or 30 µM ③ FIG. 6) when compared with untreated cells (CTR ①; FIG. 6).

In an embodiment, the dopaminergic neuroprotective capacity of [Chol]$_2$[N1(4)inh]+N1(4)inh was evaluated in PD in vitro models.

The neuroprotective evaluations were performed using 20 µM [Chol]$_2$[N1(4)inh]+N1(4)inh or 20 µM cholinium chloride in order to exclude the possibility that the neuroprotection was due to the cholinium salt and not the IL-based formulation.

The neurotoxins 6-hydroxydopamine (6OHDA) and 1-methyl-4-phenylpyridinium (MPP+) were individually added 2 h 30 after [Chol]$_2$[N1(4)inh]+N1(4)inh or cholinium chloride, and the stimulus maintained for 24 h, followed by the evaluation of cell viability using the CCK-8 kit.

The working concentration of [Chol]$_2$[N1(4)inh]+N1(4)inh chosen was 20 µM, based on results previously obtained with the non-reformulated inhibitor (N1(4)inh).

Figure 7:
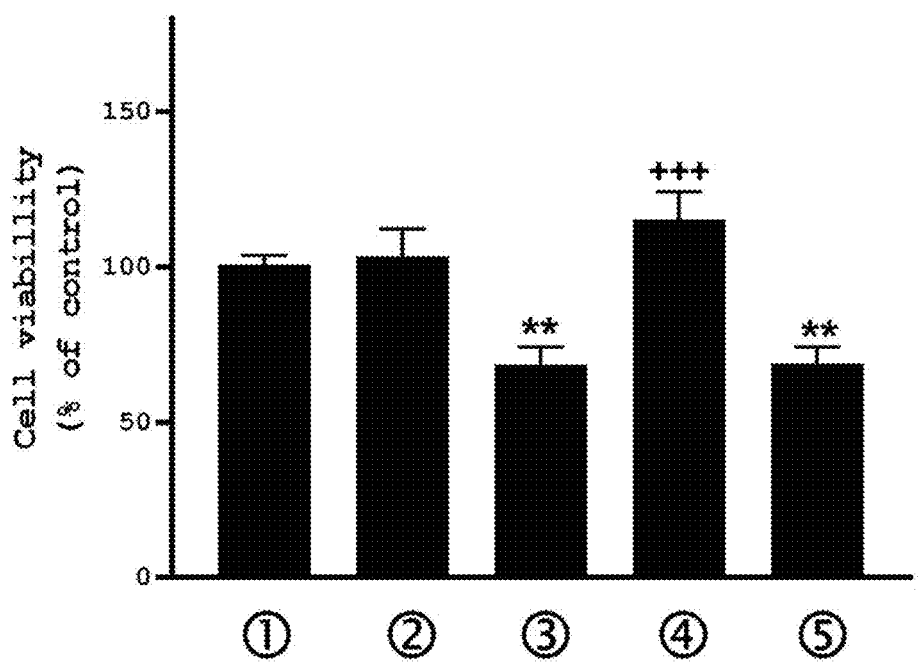
FIG. 7 shows that pretreatment of dopaminergic neuronal cells (N27) with [Chol]$_2$[N1(4)inh]+N1(4)inh significantly prevents the neurotoxic effect of 6OHDA. (1) Untreated cells; (2) Cells exposed to 20 mM of [Chol]$_2$[N1(4)inh]+N1(4)inh; (3) Cells exposed to 50 mM of 6OHDA; (4) Cells exposed to 50 mM of 6OHDA and 20 mM of [Chol]$_2$[N1(4)inh]+N1(4)inh; (5) Cells exposed to 50 mM of 6OHDA and 20 mM of Choline-chloride.

In an embodiment, when comparing the condition of cells treated with 6OHDA, it is possible to observe a reduction of 45% in the viability of dopaminergic neurons, which is statistically different from the control condition (CTR ①) (FIG. 7). Pretreatment with [Chol]$_2$[N1(4)inh]+N1(4)inh 2.5 h before exposure to 50 µM of 6OHDA prevented the toxin-induced neurotoxicity, and there were no statistically significant differences when comparing the cell viability values between the conditions CTR vs. 6OHDA+[Chol]$_2$[N1(4)inh]+N1(4)inh, but rather between the latter and the 6OHDA condition alone (FIG. 7).

In an embodiment, the results presented in FIG. 7 also shown that the decrease in the viability of N27 induced by 6OHDA, is not prevented by the pretreatment with 20 µM cholinium chloride, indicating that the protective effect of [Chol]$_2$[N1(4)inh]+N1(4)inh, described above, is due to the specific efficacy of the Nox1 inhibitor anion and not to the presence of cholinium in the formulation.

Figure 8:
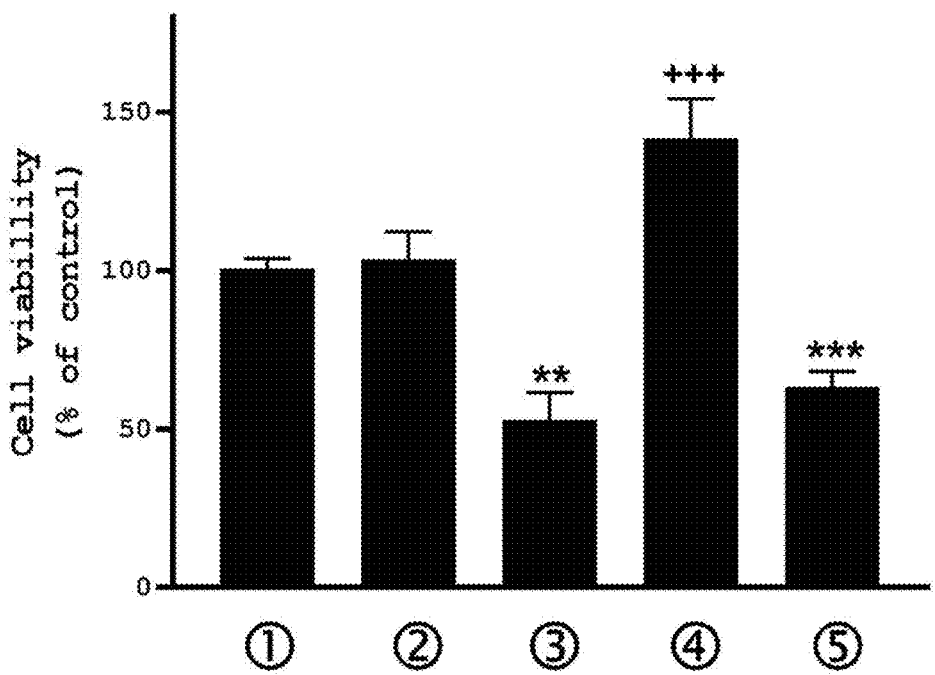
FIG. 8 shows that pretreatment of dopaminergic neuronal cells (N27) with [Chol]$_2$[N1(4)inh]+N1(4)inh significantly prevents the neurotoxic effect of the neurotoxin MPP+. (1) Untreated cells; (2) Cells exposed to 20 mM of [Chol]$_2$[N1(4)inh]+N1(4)inh; (3) Cells exposed to 10 mM of MPP+; (4) Cells exposed to 10 mM of MPP+ and 20 mM of [Chol]$_2$[N1(4)inh]+N1(4)inh; (5) Cells exposed to 10 mM of MPP+ and 20 mM of Choline-chloride.

In an embodiment, [Chol]$_2$[N1(4)inh]+N1(4)inh also plays a neuroprotective role in the prevention of MPP+ dopaminergic neurotoxicity, since it significantly prevented the 45% loss of N27 cells viability exposed to this neurotoxin (FIG. 8). As verified for 6OHDA, pretreatment with cholinium chloride did not exert any protective effect against MPP+, reinforcing the fact that the protection observed in the presence of [Chol]$_2$[N1(4)inh]+N1(4)inh arise from the effect of the inhibitor and not cholinium (FIG. 8).

Then, the biological effect of [Chol]$_2$[N1(4)inh]+N1(4)inh was evaluated in vivo. All animal experiments were performed in accordance with institutional animal house, national and European Community regulations (86/609/ECC; 2010/63/EU).

First the toxicity of [Chol]$_2$[N1(4)inh]+N1(4)inh (1:1) was evaluated in healthy mice, using two different routes of administration 1) 7 days brain intraventricular infusion of 0.2 mg/kg/day of [Chol]2[N1(4)inh]+N1(4)inh; 2) twice a day intranasal administration of 0.16; 0.08, 0.04 or 0.02 mg/kg/day of [Chol]2[N1(4)inh]+N1(4)inh during 14 days.

Figure 9:
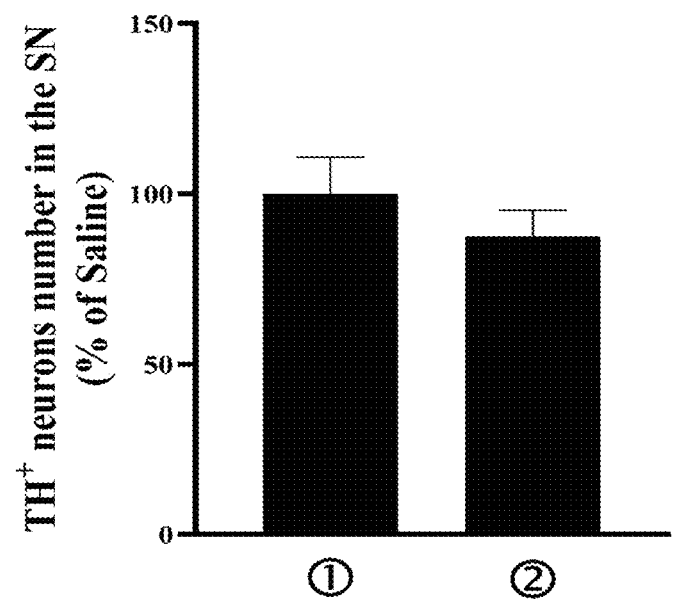
FIG. 9 shows the effect of [Chol]$_2$[N1(4)inh]+N1(4)inh brain intraventricular infusion in dopaminergic neurons viability in mice substantia nigra (SN). (1) Untreated mice; (2) Mice exposed 7 to 0.2 mg/kg/day of [Chol]$_2$[N1(4)inh]+N1(4)inh (1:1).

In an embodiment, male C57BL/6 mice with 8-12 week-old were housed in a temperature/humidity-controlled environment under 12 h light/dark cycle with free access to water and food. 1) Mice were anesthetized with an intraperitoneal (i.p.) injection of ketamine (0.67 mL/kg of mouse weight) and xylazine (0.33 ml/kg of mouse weight) in saline, before they were placed in the digital stereotaxic frame (51900 Stoelting). Once the mouse skull was exposed and, using a digital coordinates system, the infusion sites were determined setting the zero at the bregma point. The delivery of [Chol]$_2$[N1(4)inh]+N1(4)inh (1:1) at a dose of 0.2 mg/kg/day, was performed by its direct intraventricular infusion during 7 days, performed using Alzet osmotic pump (ref. 1007D) connected to an Alzet catheter (Ref. Brain infusion Kit 3), in the coordinates medial-lateral (ML): −1.1 mm; anterior-posterior (AP): 0.5 mm and dorsoventral (DV): −2.5. On day 7, animals were anesthetized with an intraperitoneal (i.p.) injection of ketamine (0.67 mL/Kg of mouse weight) and xylazine (0.33 mL/Kg of mouse weight) in saline, and transcardiacly perfused first with saline, and after with buffered formaline (experiments end-point). The brains were frozen by liquid nitrogen and kept at −80° C. Subsequently, brains were incorporated in a gel of ideal cutting temperature (OCT) to be sectioned in a cryostat (Leica CM 3050S, Leica Microsystems). Coronal sections with a thickness of 30 µm from the front pole to the end of the midbrain were collected at −20° C. Sections corresponding to the ST and SN of each animal were collected and stored sequentially in free-floating 24-well plate compartments (Orange Scientific), containing a cryopreservation solution of 30% glycerol (v/v) and 30% (v/v) ethylene glycol in phosphate buffer (PB). The plates were kept at −20° C. properly identified for later use in immunohistochemistry to evaluate the number of dopaminergic neurons in the susbtantia nigra (SN) by stereological count of the neurons immune-positive for the specific cellular marker tyrosine hydroxylase (TH). The results presented in FIG. 9 showed that the administration of [Chol]$_2$[N1(4)inh]+N1(4)inh did not significantly reduced the number of dopaminergic (TH+) neurons in the substantia nigra (SN) after 7 days of brain intraventricular infusion of 0.2 mg/kg/day of [Chol]2[N1(4)inh]+N1(4)inh. Showing the non-toxic profile of the IL-based formulation. 2) to evaluate the general putative toxicity of [Chol]2[N1(4)inh]+N1(4)inh when administrated via intranasal route in mice, general anesthesia was induced by inhalation of 3-4%

Figure 11:
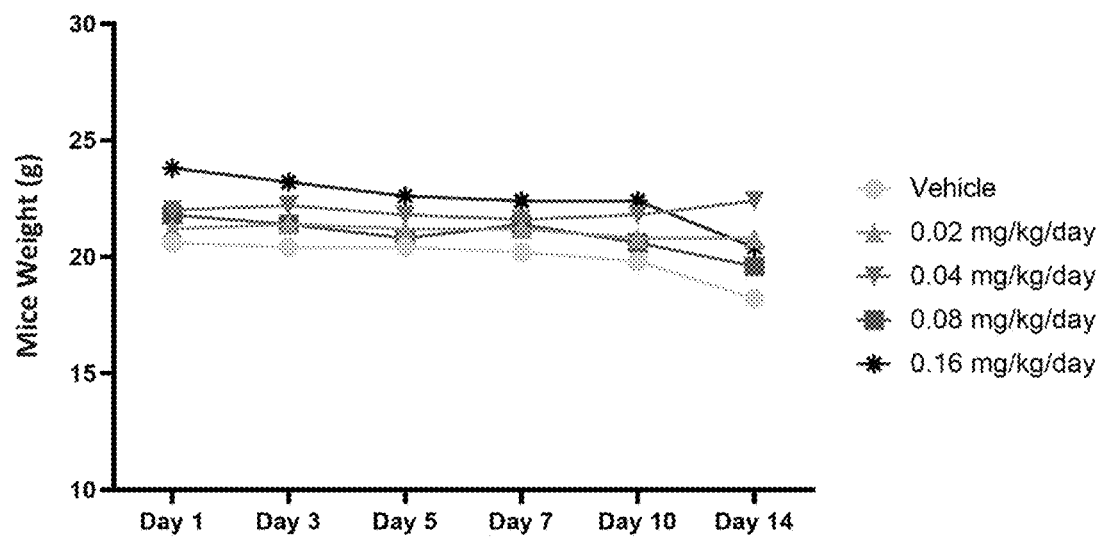
FIG. 11 shows the effect of 0.02; 0.04; 0.08; 0.16 mg/kg/day of [Chol]$_2$[N1(4)inh]+N1(4)inh, intranasal administration twice a day for 14 days on mice weight.
Figure 12:
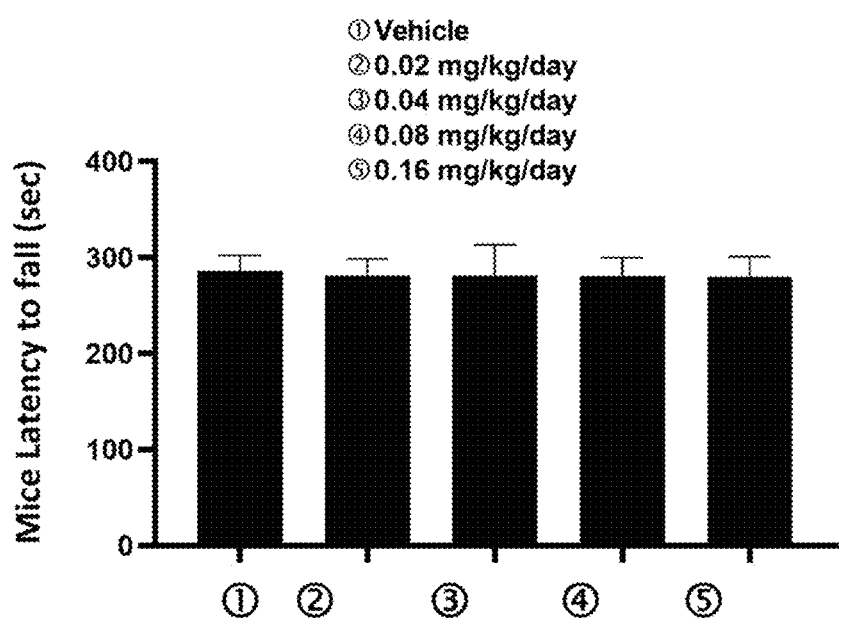
FIG. 12 shows the effect of (1) Vehicle (2) 0.02; (3) 0.04; (4) 0.08; (5) 0.16 mg/kg/day of [Chol]$_2$[N1(4)inh]+N1(4)inh, intranasal administration twice a day for 14 days on mice motor performance.
Figure 13:
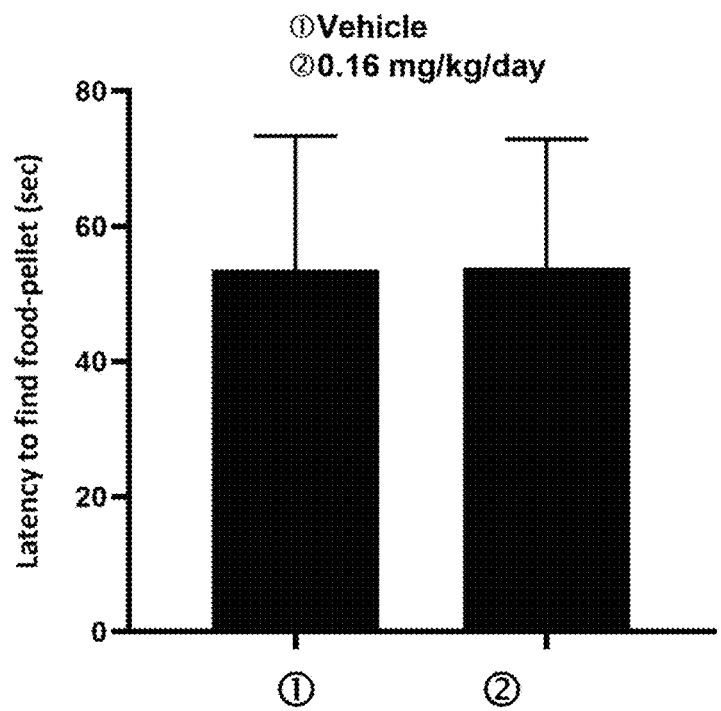
FIG. 13 shows the effect of 0.16 mg/kg/day of [Chol]$_2$[N1(4)inh]+N1(4)inh, intranasal administration twice a day for 14 days on mice olfactory function. (1) Vehicle (untreated group); (2) 0.16 mg/kg/day of [Chol]$_2$[N1(4)inh]+N1(4)inh treated group.

(v/v) isoflurane for 4 minutes, to enable the intranasal administration of 4 different doses (0.16; 0.08, 0.04 or 0.02 mg/kg/day) of [Chol]2[N1(4)inh]+N1(4)inh in mice twice a day during 14 days. Inline, mice lying face up with elevated snout were instilled using a polyurethane catheter (Introcan Safety®; 24G; 0.7×19 mm) attached to a 50 μL microliter syringe (Hamilton®, USA) with 6 μl of [Chol]2[N1(4)inh]+N1(4)inh per 30 g of mice body weight. The catheter was inserted about 0.3 mm deep into one of the nares, enabling the delivery of the formulation towards the roof of the nasal cavity. Animals were kept in the above-mentioned position until they woke up, to prevent the IL based formulation to enter the respiratory tract and stay longer in the nasal cavity. The day of the first administration was considered day 1. Motor coordination, balance and grip strength were analyzed using a mice rotarod apparatus model 47600 (Ugo Basile, Comerio, Italy). All mice were pretrained on the rotarod to learn and reach a consistent performance. The training was performed in 2 consecutive days before the first administration, on each day 4 test trials were assessed, each lasting 5 min. Mice were trained at 12 RPM (fixed mode) on day 1; at 24 RPM (fixed mode) for 2 test trials and at 4-40 RPM (accelerated mode). The animals were allowed to rest approximately 30 min between each trial. The rotarod test was performed under an accelerating protocol (4-40 RPM) for 5 min, and the latency to fall was recorded using a specific software. The trial stopped when the mouse fell (activating a switch that automatically stopped the timer) or when 5 min had been completed. Each animal was given four independent trials with approximately 30 min inter-trial period to reduce stress and fatigue. To investigate olfactory function, the food finding test (FFT) olfactory paradigm was performed. Mice were restricted from food for a period of 16 hours before the test. On the test day, animals were placed in clean cages with just a filter top lid, with ~4 cm of clean bedding evenly distributed throughout the cage, for habituation for 30-40 min (no water, no food). After habituation, animals were placed back in their home cage. Then, one food pellet was buried in one of the sides of the cage, covered with bedding. To start the test, the animal was placed on the opposite side of the buried pellet, the timer was started and the top lid placed. The timer was stopped when the animal uncovered the pellet and began to eat it. In the case that the animal did not find the pellet within 5 min, the trial ended with 5 min score. Following the trial, animals were returned to their home cage. In summary, the toxicity of [Chol]2[N1(4)inh]+N1(4)inh administrated via intranasal route in mice was evaluated by analysing animal weight, behavior motor performance and the ability to find a food pellet in the. Inline, mice were weighted everyday for 14 days, the rotarod motor behavior assay performed at day 14, and the olfactory test performed at day 14. As shown in FIGS. 11, 12 and 13, no changes in weight, motor and olfactory performance were observed in mice administrated via intranasal route with [Chol]2[N1(4)inh]+N1(4)inh, reinforcing its non-toxic profile of the IL-based formulation.

Second the toxicity of [Chol]2[N1(4)inh]+N1(4)inh was evaluated in healthy rat using two different routes of administration 1) 30 days of brain intraventricular infusion of 0.007 mg/kg/day of [Chol]2[N1(4)inh]+N1(4)inh and 2) daily intranasal administration of 0.062 mg/kg/day of [Chol]2[N1(4)inh]+N1(4)inh during 30 days.

Figure 14:
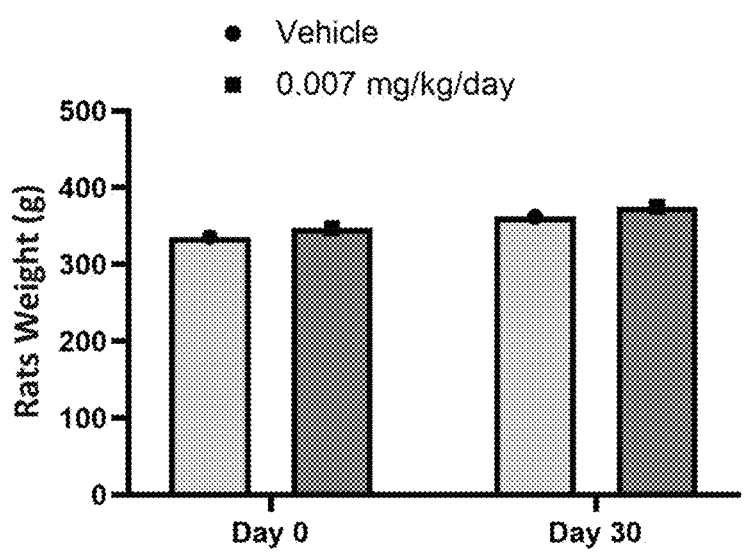
FIG. 14 shows the effect of 0.007 mg/kg/day of [Chol]$_2$[N1(4)inh]+N1(4)inh, once a day for 30 days brain intra-ventricle administration on rats weight.
Figure 15:
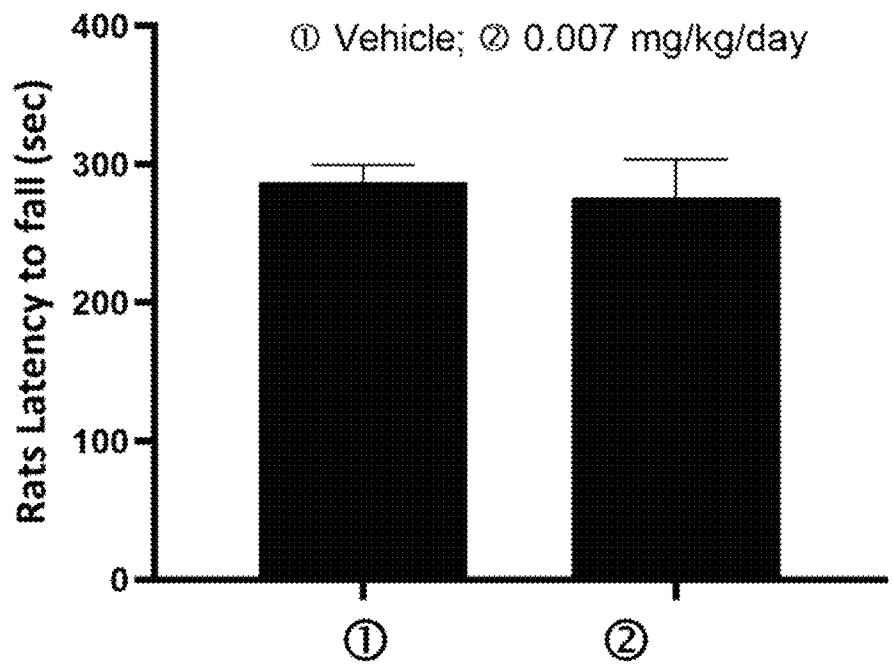
FIG. 15 shows the effect of 0.007 mg/kg/day of [Chol]$_2$[N1(4)inh]+N1(4)inh, once a day for 30 days brain intra-ventricle administration on rats motor performance.
Figure 16:
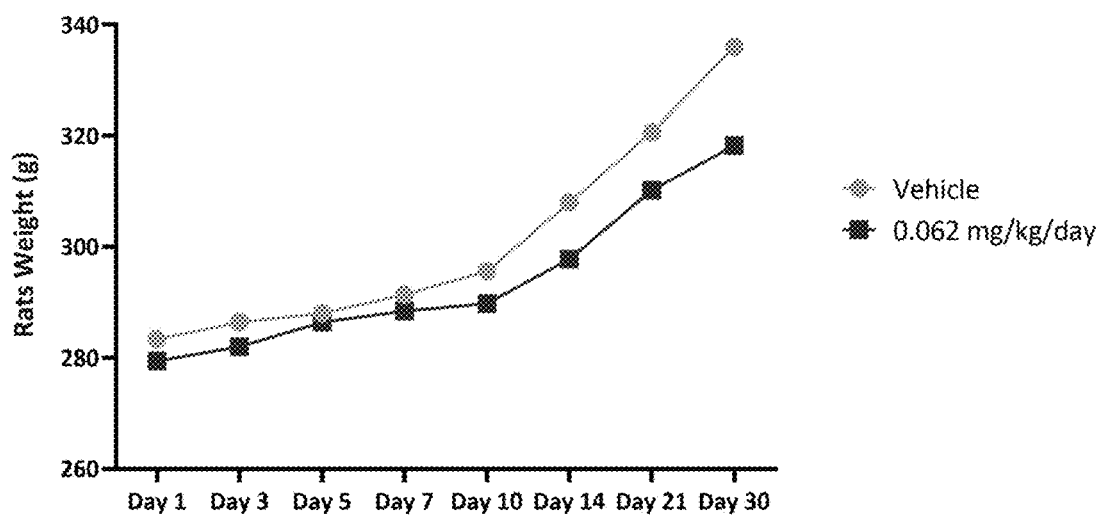
FIG. 16 shows the effect of 0.062 mg/kg/day of [Chol]$_2$[N1(4)inh]+N1(4)inh, once a day for 30 days intranasal administration on rats weight.
Figure 17:
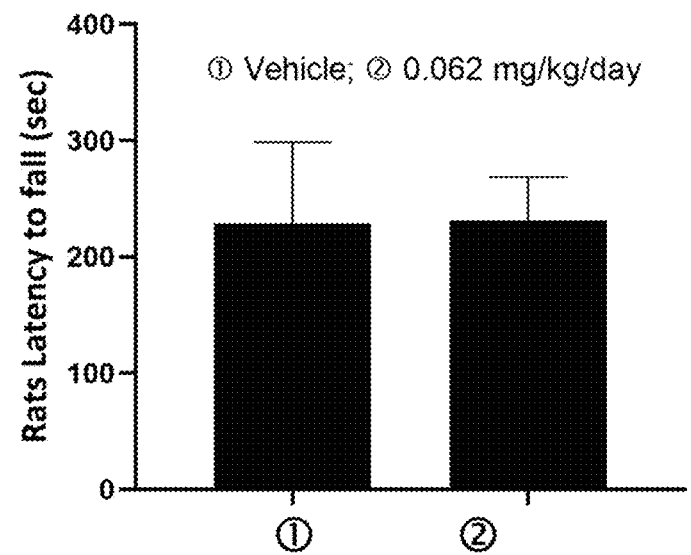
FIG. 17 shows the effect of 0.062 mg/kg/day of [Chol]$_2$[N1(4)inh]+N1(4)inh, once a day for 30 days intranasal administration on rats motor performance. (1) Vehicle (untreated group); (2) 0.062 mg/kg/day of [Chol]$_2$[N1(4)inh]+N1(4)inh treated group.
Figure 18:
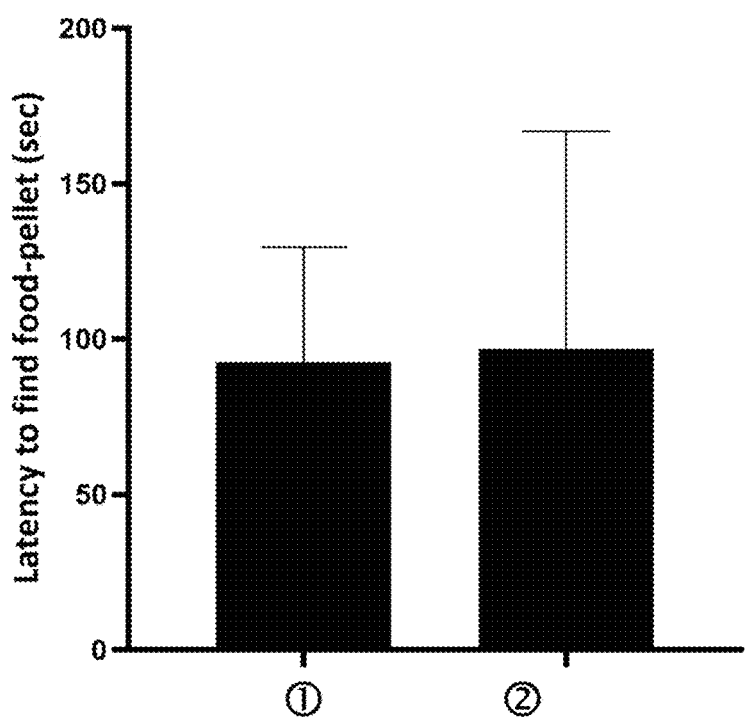
FIG. 18 shows the effect of 0.062 mg/kg/day of [Chol]$_2$[N1(4)inh]+N1(4)inh, once a day for 30 days intranasal administration on rats olfactory function. (1) Vehicle (untreated group); (2) 0.062 mg/kg/day of [Chol]$_2$[N1(4)inh]+N1(4)inh treated group.

In an embodiment, male wistar rats with 8-12 week-old were housed in a temperature/humidity-controlled environment under 12 h light/dark cycle with free access to water and food. 1) Rats were anesthetized with an intraperitoneal (i.p.) injection of ketamine (90 mg/kg) and xylazine (10 mg/kg) in saline, before they were placed in the digital stereotaxic frame (51900 Stoelting). Once the rat skull was exposed and, using a digital coordinates system, the infusion sites were determined setting the zero at the bregma point. The delivery of [Chol]2[N1(4)inh]+N1(4)inh (1:1) at a dose of 0.007 mg/kg/day, was performed by its direct intraventricular infusion during 30 days, performed using Alzet osmotic pump (ref. 2004) connected to an Alzet catheter (Ref. Brain infusion Kit 2), in the coordinates medial-lateral (ML): 1.5 mm; anterior-posterior (AP): −1.0 mm and dorsoventral (DV): −4.0. Toxicity was evaluated by analysing animal weight at day 0 and day 30 and their behavior motor performance at day 21. Motor coordination, balance and grip strength were analyzed using a rat rotarod apparatus model 47700 (Ugo Basile, Comerio, Italy). All rats were pretrained on the rotarod to learn and reach a consistent performance. The training was performed in 2 consecutive days, on each day 4 test trials were assessed, each lasting 5 min. Rats were trained at 12 RPM (fixed mode) first at 24 RPM (fixed mode) for 2 test trials and then at 4-40 RPM (accelerated mode) for other 2 test trials. The animals were allowed to rest approximately 30 min between each trial. The rotarod test was performed under an accelerating protocol (4-40 RPM) for 5 min, and the latency to fall was recorded using a specific software. The trial stopped when the mouse fell (activating a switch that automatically stopped the timer) or when 5 min had been completed. Each animal was given four independent trials with approximately 30 min inter-trial period to reduce stress and fatigue. The results presented in FIGS. 14 and 15 showed that the administration of [Chol]2[N1(4)inh]+N1(4)inh did not significantly induced changes in weight nor in motor performance, showing the non-toxic profile of the IL-based formulation. 2) To evaluate the general putative toxicity of [Chol]2[N1(4)inh]+N1(4)inh when administered via intranasal route in rats, general anesthesia was induced by inhalation of 3-4% (v/v) isoflurane for 4 minutes, to enable the intranasal administration of 0.062 mg/kg/day of [Chol]2[N1(4)inh]+N1(4)inh in rats once a day during 14 days. Inline, rats were placed lying face up with elevated snout, and were instilled using a polyurethane catheter (Introcan Safety®; 24G; 0.7×19 mm) attached to a 50 μL microliter syringe (Hamilton®, USA) with 40 μl of the [Chol]2[N1(4)inh]+N1(4)inh per 260 g of rat's body weight. The catheter was inserted about 1.7 mm deep into the right and left nostrils, enabling the delivery of the formulation towards the roof of the nasal cavity. Animals were kept in the above-mentioned position until they woke up, to prevent the IL-based formulation to enter the respiratory tract and stay longer in the nasal cavity. Motor coordination, balance and grip strength were analyzed using a rat rotarod apparatus model 47700 (Ugo Basile, Comerio, Italy). All rats were pretrained on the rotarod to learn and reach a consistent performance. The training was performed in 2 consecutive days, on each day 4 test trials were assessed, each lasting 5 min. Rats were trained at 12 RPM (fixed mode) first at 24 RPM (fixed mode) for 2 test trials and then at 4-40 RPM (accelerated mode) for other 2 test trials. The animals were allowed to rest approximately 30 min between each trial. The rotarod test was performed under an accelerating protocol (4-40 RPM) for 5 min, and the latency to fall was recorded using a specific software. The trial stopped when the mouse fell (activating a switch that automatically stopped the timer) or when 5 min had been completed. Each animal was given four independent trials with approximately 30 min inter-trial period to reduce stress and fatigue. To investigate olfactory function, the food finding test (FFT) olfactory paradigm was performed. Rats were restricted from food for a period of 16 hours before the test. On the test day, animals were placed in clean cages with just a filter top lid, with ~4 cm of clean bedding evenly distributed throughout the cage, for habituation for 30-40 min (no water, no food). After habituation, animals were placed back in their home cage. Then, one food pellet was buried in one of the sides of the cage, covered with bedding. To start the test, the animal was placed on the opposite side of the buried pellet, the timer was started and the top lid placed. The timer was stopped when the animal uncovered the pellet and began to eat it. In the case that the animal did not find the pellet within 5 min, the trial ended with 5 min score. Following the trial, animals were returned to their home cage. Overall, toxicity was evaluated by analysing rats weight, their behavior motor performance and their ability to find a food pellet hidden in the cage. Inline, rat were weighted everyday for 30 days, the rotarod motor behavior assay performed at day 30, and the olfactory test performed at day 30. As shown in FIGS. 16, 17 and 18 no changes in weight, motor and olfactory performance respectively were observed in rats administrated via intranasal route with [Chol]2[N1(4)inh]+N1(4)inh reinforcing its non-toxic profile of the IL-based formulation.

In an embodiment the overall results obtained related with the in vivo toxicity of [Chol]2[N1(4)inh]+N1(4)inh, prove that the IL-based formulation is not toxic either when administrated via brain intraventricular route nor via intranasal route.

Afterward, the neuroprotective capacity of $[Chol]_2[N1(4)inh]+N1(4)inh$ was evaluated in two in vivo model of PD, one induced by the intracerebral injection of 6OHDA and the other induced by the exposure to a chronic low dose of paraquat (PQ).

In an embodiment, the biological neuroprotective effect of $[Chol]_2[N1(4)inh]+N1(4)inh+N1(4)inh$ when administrated via brain intraventricular infusion route was evaluated in an mouse model for PD induced by the intracerebral injection of 6OHDA, and the number of dopaminergic neurons in the substantia nigra counted.

Figure 10:
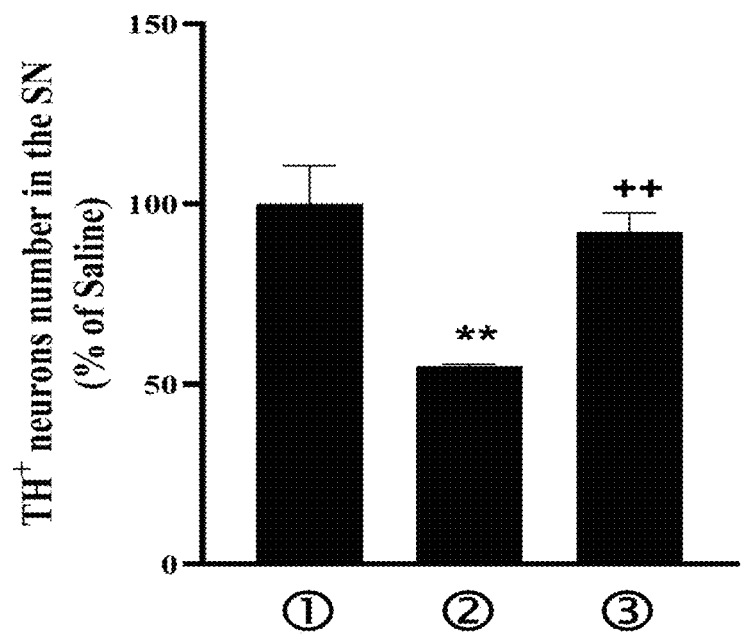
FIG. 10 shows that brain intraventricular infusion of [Chol]$_2$[N1(4)inh]+N1(4)inh prevented the death of dopaminergic neurons in the substantia nigra (SN) induced by intrastriatal injection of 6OHDA, an animal model of Parkinson's disease. (1) Untreated mice; (2) Mice exposed to 10 mg of 6OHDA; (3) Mice exposed to 10 mg of 6OHDA and to 0.2 mg/kg/day of [Chol]$_2$[N1(4)inh]+N1(4)inh (1:1)

In an embodiment, Male C57BL/6 mice were anesthetized and placed in the digital stereotaxic frame. Once the mouse skull was exposed, and using a digital coordinates system, injection and infusion sites were determined setting the zero at the bregma point. Hereupon, an injection of 6-OHDA (10 μg/2 μL of ascorbic acid 0.1% v/v) was performed in the right striatum (ST) of each animal using the coordinates: medial-lateral (ML): −2 mm; anterior-posterior (AP): 0.6 mm; dorsoventral (DV): −3.0 mm, using a Hamilton syringe at speed of 0.2 μL/min. The delivery of 0.2 mg/kg/day of $[Chol]_2[N1(4)inh]+N1(4)inh+N1(4)inh$ was performed as describe above. On day 7, animals were anesthetized with an intraperitoneal (i.p.) injection of ketamine (0.67 mL/kg of mouse weight) and xylazine (0.33 mL/kg of mouse weight) in saline, and transcardiacly perfused first with saline, and after with buffered formaline (experiments end-point). The brains were frozen by liquid nitrogen and kept at −80° C. Subsequently, brains were incorporated in a gel of ideal cutting temperature (OCT) to be sectioned in a cryostat (Leica CM 3050S, Leica Microsystems). Coronal sections with a thickness of 30 μm from the front pole to the end of the midbrain were collected at −20° C. Sections corresponding to the ST and SN of each animal were collected and stored sequentially in free-floating 24-well plate compartments (Orange Scientific), containing a cryopreservation solution of 30% (v/v) glycerol and 30% (v/v) ethylene glycol in phosphate buffer (PB). The plates were kept at −20° C. properly identified for later use in immunohistochemistry to evaluate the number of dopaminergic neurons in the SN by stereological count of TH+ neurons. Two experimental groups were used: 1) mice injected with 6-OHDA in the right striatum and saline (0.9% m/v NaCl) in the left striatum and 2) mice injected with 6-OHDA in the right striatum, saline in the left and $[Chol]_2[N1(4)inh]+N1(4)inh$ in the lateral ventricle. The hemispheres injected with saline were considered controls for 6OHDA in group 1, and $[Chol]_2[N1(4)inh]+N1(4)inh$ only in group 2. In group 2, the intraventricular and stereotaxic procedures were performed in the same day. As depicted in FIG. 10, the exposure to 6-OHDA, induced a statistically significant reduction of 45% in the number of SN dopaminergic neurons when compared with the control group (FIG. 10; ② versus ①). As for the dopaminergic neuroprotective effect of $[Chol]_2[N1(4)inh]+N1(4)inh$, the results demonstrate that it has a neuroprotective capacity, as the presence of the IL-based formulation prevented 37% of SN dopaminergic neurodegeneration induced by 6-OHDA in mice SN (FIG. 10; ③ versus ②).

In an embodiment, the biological neuroprotective effect of $[Chol]_2[N1(4)inh]+N1(4)inh+N1(4)inh$ when administrated via brain intraventricular infusion route was evaluated in a rat model for PD induced by the exposure to a low chronic dose of PQ, through the analysis of the progression of behavior dysfunction. In this model, the animals are exposed to the toxin during 30 days (4 weeks) and then keeped alive during more 30 days to allow the pathology to progress (Total 8 weeks). The administration of $[Chol]_2[N1(4)inh]+N1(4)inh$ started after the first 30 exposure to PQ, via brain intraventricle or intranasal route and lasted the second 30 days. Animals were euthanized at week 8.

In an embodiment, male wistar rats 8-12 week-old were housed in a temperature/humidity-controlled environment under 12 h light/dark cycle with free access to water and food and subjected to subcutaneous chronic administration of PQ, that was carried out using osmotic minipumps (Alzet Durect, Cupertino, CA) at a dose of 2.5 mg/kg/day with a fluid delivery rate of 0.25 μL/hr for a period of four weeks (Alzet model 2004, large pumps). Control groups were implanted with minipump filled with sterile saline, the vehicle used to dissolve PQ. The pumps were implanted subcutaneously on the back, slightly posterior to the scapulae (shoulder blades), for that rats were anesthetized with intraperitoneal (i.p.) injection of ketamine (90 mg/kg) and xylazine (10 mg/kg). Four weeks after been exposed to PQ, the intraventricular infusion of $[Chol]_2[N1(4)inh]+N1(4)inh+N1(4)inh$ started and lasted during 4 more weeks. The experimental paradigm involved a total of 8 weeks, the first 4 weeks are for PQ exposure and the last 4 weeks are for IL-based formulation administration. For that rats were anesthetized and placed in the digital stereotaxic frame (51900 Stoelting). Once the rat skull was exposed and, using a digital coordinates system, the infusion sites were determined setting the zero at the bregma point. The delivery of [Chol]2[N1(4)inh]+N1(4)inh (1:1) at a dose of 0.007 mg/kg/day, was performed by its direct intraventricular infusion during four more weeks (30 days), performed using Alzet osmotic pump (ref. 2004) connected to an Alzet catheter (Ref. Brain infusion Kit 2), in the coordinates medial-lateral (ML): 1.5 mm; anterior-posterior (AP): −1.0 mm and dorsoventral (DV): −4.0. To evaluate the neuroprotective function of the IL-based formulation when infused in brain ventricle, behavior function was evaluated. Motor coordination, balance and grip strength were analyzed using a rat rotarod apparatus model 47700 (Ugo Basile, Comerio, Italy). All rats were pretrained on the rotarod to learn and reach a consistent performance. The training was performed in 2 consecutive days, on each day 4 test trials were assessed, each lasting 5 min. Rats were trained at 12 RPM (fixed mode) first at 24 RPM (fixed mode) for 2 test trials and then at 4-40 RPM (accelerated mode) for other 2 test trials. The animals were allowed to rest approximately 30 min between each trial. The rotarod test was performed under an accelerating protocol (4-40 RPM) for 5 min, and the latency to fall was recorded using a specific software. The trial stopped when the mouse fell (activating a switch that automatically stopped the timer) or when 5 min had been completed. Each animal was given four independent trials with approximately 30 min inter-trial period to reduce stress and fatigue. The open-field test was used to measure exploratory behaviors and general activity. Animals were transported to the testing room and left undisturbed for 30 minutes to 1 hour before the test. All around the arena is a beam break system, which is interrupted with the animal movement inside the arena. This information is processed in a specific software allowing to analyze several parameters such as distance, speed, rears and enters in the center. Each animal was placed in the center of the rectangular arena and allowed to explore freely for 10 min. The timer was started at the exact same time as the animal was placed in the arena. The operator has leaved the room. Between each animal, the arena was wiped with 70% (v/v) ethanol, and the next animal was placed. All behavior test were performed at week 8. The results presented show that brain intravetricle administration of [Chol]$_2$[N1(4)inh]+N1(4)inh significantly prevented the motor dysfunction (FIG. 19), as well as the reduction in the traveled distance (FIG. 20) and the speed (FIG. 21) induced by PQ. These highlight that the IL-based formulation is capable to reduce the progression of motor dysfunction in PD context.

Figure 19:
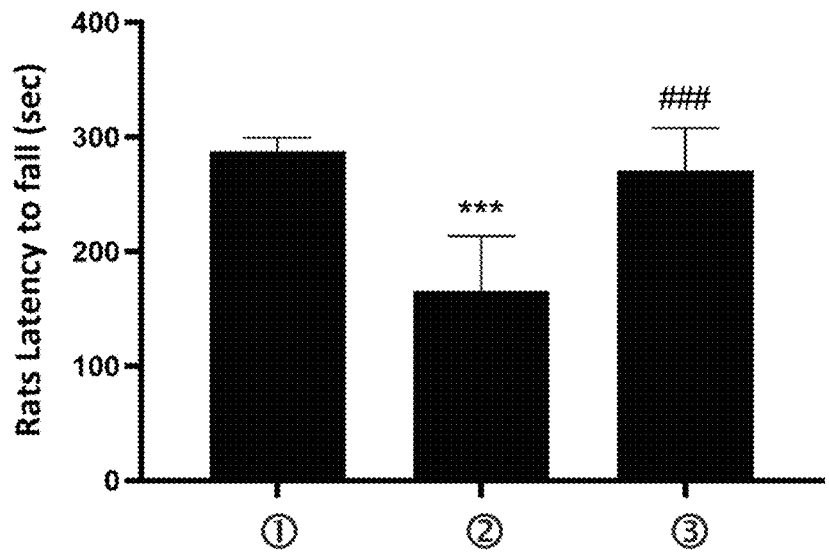
FIG. 19 shows that 0.007 mg/kg/day of [Chol]$_2$[N1(4)inh]+N1(4)inh brain intra-ventricle administration once a day for 30 days prevents the progression of motor dysfunction induced by PQ in rats, an animal model for PD. (1) Control group (saline only); (2) PQ treated group; (3) PQ and [Chol]$_2$[N1(4)inh]+N1(4)inh co-treated group.

As depicted in FIG. 19, the exposure to PQ, induced a statistically significant reduction of 43% in the latency to fall of animals exposed to PQ when compared with the control group (FIG. 19; ② versus ①). As for the neuroprotective effect of [Chol]$_2$[N1(4)inh]+N1(4)inh, the results demonstrate that it has a the capacity to prevent the development of motor dysfunction, as it as increased the latency to fall of animals exposed to PQ in 37% when compared with the animals exposed to PQ only (FIG. 19; ③ versus ②).

Figure 20:
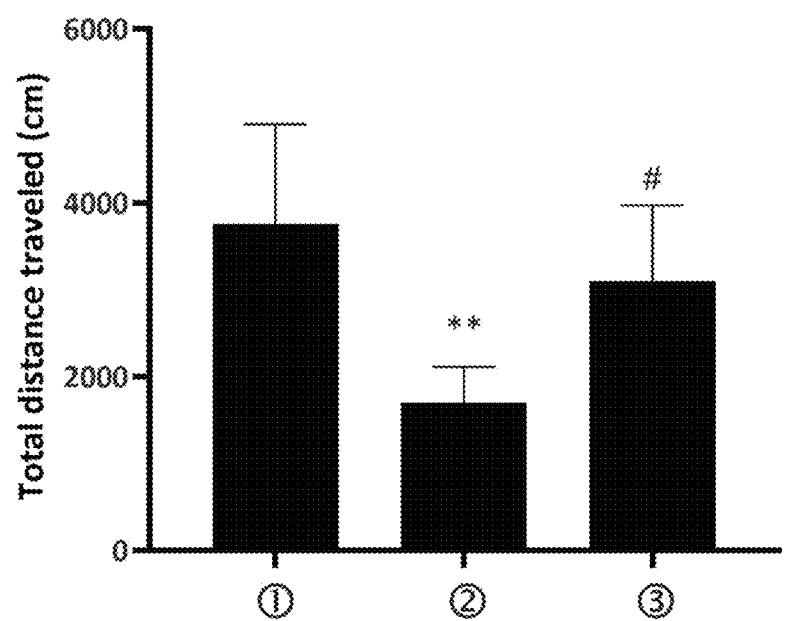
FIG. 20 shows that 0.007 mg/kg/day of [Chol]$_2$[N1(4)inh]+N1(4)inh brain intra-ventricle administration once a day for 30 days prevents the reduction in the distance travelled induced by PQ in rats, an animal model for PD. (1) Control group (saline only); (2) PQ treated group; (3) PQ and [Chol]$_2$[N1(4)inh]+N1(4)inh co-treated group.
Figure 21:
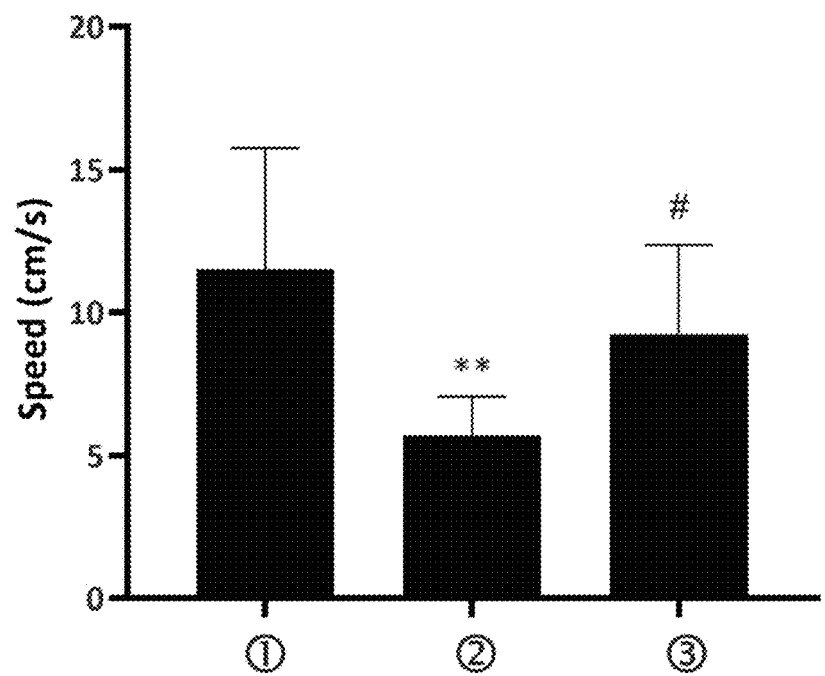
FIG. 21 shows that that 0.007 mg/kg/day of [Chol]$_2$[N1(4)inh]+N1(4)inh brain intra-ventricle administration once a day for 30 days prevents the reduction in the animal speed induced by PQ in rats, an animal model for PD. (1) Control group (saline only); (2) PQ treated group; (3) PQ and [Chol]$_2$[N1(4)inh]+N1(4)inh co-treated group.

As for the rats distance travelled and speed results depicted in FIGS. 20 and 21, respectively, PQ induced a reduction of 55% in the distance travelled (FIG. 20; ② versus ①) and a 50% reduction of speed (FIG. 21: ② versus ①). As for the neuroprotective effect of [Chol]$_2$[N1 (4)inh]+N1(4)inh, the results demonstrate that it has a the capacity to prevent the development of motor dysfunction, as it as increased 50% the distance travelled (FIG. 20; ③ versus ②) and 37% the speed (FIG. 21; ③ versus ②) of animals exposed to PQ when compared with the animals exposed to PQ only.

In an embodiment, the biological neuroprotective effect of [Chol]$_2$[N1(4)inh]+N1(4)inh+N1(4)inh when administrated via intranasal route was evaluated in rat model for PD induced by the exposure to a low chronic dose of PQ and through the analysis of the progression of behavior dysfunction. In this model, the animals are exposed to the toxin during 30 days (4 weeks) and then keeped alive during more 30 days to allow the pathology to progress (Total 8 weeks). The administration of [Chol]$_2$[N1(4)inh]+N1(4)inh started after the first 30 exposure to PQ, via brain intraventricle or intranasal route and lasted the second 30 days. Animals were euthanized at week 8.

Figure 22:
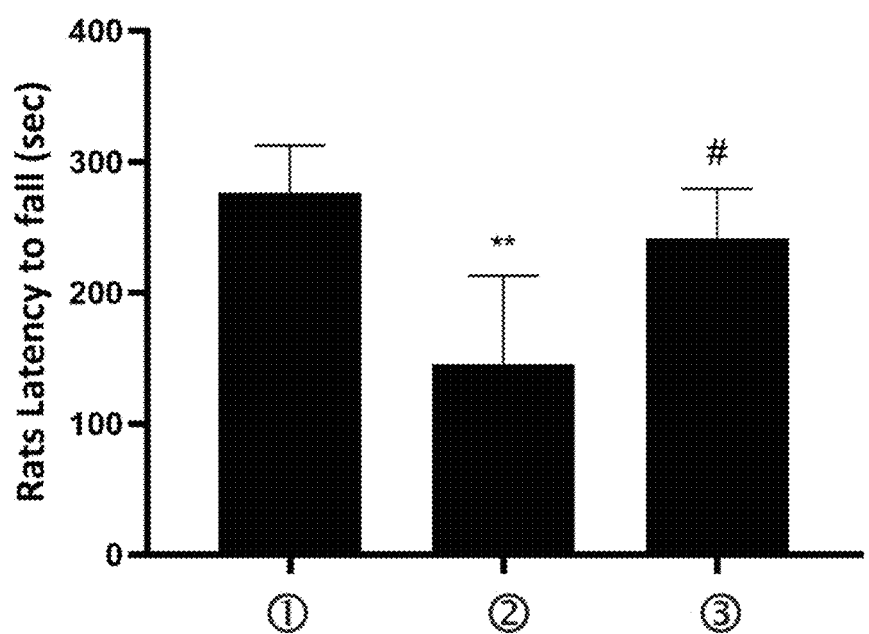
FIG. 22 shows that 0.062 mg/kg/day of [Chol]2[N1(4)inh]+N1(4)inh, once a day for 30 days intranasal administration prevents the progression of motor dysfunction induced by PQ in rats, an animal model for PD. (1) Control group (saline only); (2) PQ treated group; (3) PQ and [Chol]$_2$[N1(4)inh]+N1(4)inh co-treated group.
Figure 23:
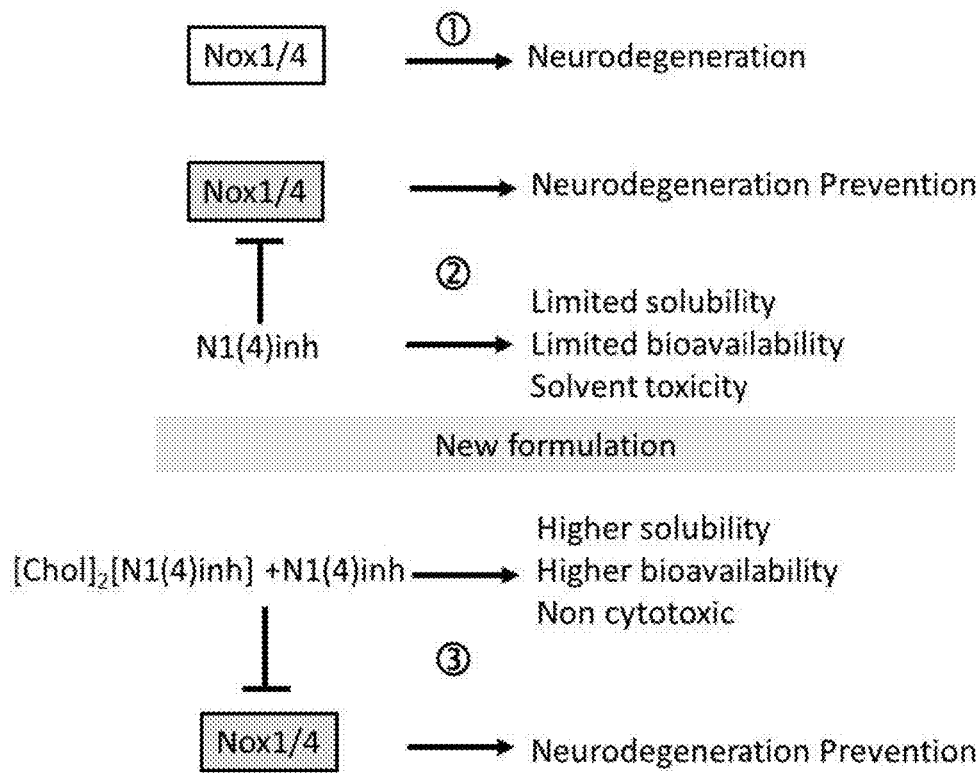
FIG. 23 shows a diagram of the summary of the invention.

In an embodiment, male wistar rats 8-12 week-old subjected to subcutaneous chronic administration of PQ, that was carried out using osmotic minipumps (Alzet Durect, Cupertino, CA) at a dose of 2.5 mg/kg/day with a fluid delivery rate of 0.25 µL/hr for a period of four weeks (Alzet model 2004, large pumps). Control groups were implanted with minipump filled with sterile saline, the vehicle used to dissolve PQ. The pumps were implanted subcutaneously on the back, slightly posterior to the scapulae (shoulder blades), under anesthesia induced by ketamine (90 mg/kg) and xylazine (10 mg/kg). Four weeks after been exposed to PQ, the intranasal delivery of [Chol]$_2$[N1(4)inh]+N1(4)inh has started and the administration was performed daily during 4 more weeks. The experimental paradigm involve a total of 8 weeks, the first 4 weeks are for PQ exposure and the last 4 weeks are for IL-based formulation administration. General anesthesia was induced by inhalation of 3-4% (v/v) isoflurane for 4 minutes, to enable the intranasal administration of 0.062 mg/kg/day of [Chol]2[N1(4)inh]+N1(4)inh in rats once a day during 4 additional weeks (30 days). Inline, rats were placed lying face up with elevated snout, and were instilled using a polyurethane catheter (Introcan Safety®; 24G; 0.7×19 mm) attached to a 50 µl microliter syringe (Hamilton®, USA) with 40 L of the [Chol]2[N1(4) inh]+N1(4)inh per 260 g of rat's body weight. The catheter was inserted about 1.7 mm deep into the right and left nostrils, enabling the delivery of the formulation towards the roof of the nasal cavity. Animals were kept in the above-mentioned position until they woke up, to prevent the IL-based formulation to enter the respiratory tract and stay longer in the nasal cavity. The following experimental groups were used: 1) rats exposed to salaine (control group); 2) rats exposed to PQ and 3) rats exposed to PQ and to [Chol]$_2$[N1(4)inh]+N1(4)inh. To evaluate the neuroprotective function of the IL-based formulation when administrated via intranasal route, behavior function was evaluated. Motor coordination, balance and grip strength were analyzed using a rat rotarod apparatus model 47700 (Ugo Basile, Comerio, Italy). All rats were pretrained on the rotarod to learn and reach a consistent performance. The training was performed in 2 consecutive days, on each day 4 test trials were assessed, each lasting 5 min. Rats were trained at 12 RPM (fixed mode) first at 24 RPM (fixed mode) for 2 test trials and then at 4-40 RPM (accelerated mode) for other 2 test trials. The animals were allowed to rest approximately 30 min between each trial. The rotarod test was performed under an accelerating protocol (4-40 RPM) for 5 min, and the latency to fall was recorded using a specific software. The trial stopped when the mouse fell (activating a switch that automatically stopped the timer) or when 5 min had been completed. Each animal was given four independent trials with approximately 30 min inter-trial period to reduce stress and fatigue. Behavior tests were performed at week 8. The results show that the intranasal administration of [Chol]$_2$[N1(4)inh]+N1(4)inh significantly prevented the motor dysfunction (FIG. 22). These highlight that the IL-based formulation is capable to reduce the progression of motor dysfunction in PD context.

As depicted in FIG. 22, the exposure to PQ, induced a statistically significant reduction of 47% in the latency to fall of animals exposed to PQ when compared with the control group (FIG. 22; ② versus ①). As for the neuroprotective effect of [Chol]$_2$[N1(4)inh]+N1(4)inh, the results demonstrate that it has the capacity to prevent the development of motor dysfunction, as it as increased the latency to fall of animals exposed to PQ in 40% when compared with the animals exposed to PQ only (FIG. 22; ③ versus ②).

In an embodiment, these results prove that [Chol]$_2$[N1(4)inh]+N1(4)inh is not toxic, unlike its insoluble precursor, exerting, however, the same neuroprotective efficacy exerted by N1(4)inh alone in the context of PD.

In an embodiment, these results prove that [Chol]$_2$[N1(4)inh]+N1(4)inh reduces the progression of motor dysfunction in PD context.

These results clearly demonstrate that the present disclosure allows us to transform a toxic molecule into a non-toxic mixture. The reformulation did not interfere with the effectiveness of the precursors, radically transforming their potential applicability as a differentiating therapeutic approach, which allows reduce/halt the progression of the pathological condition associated with PD and as such reducing the speed of increase in the degree of disability over time.

The present disclosure allows the current available therapies that modulate the symptoms to have an effect for longer time and more constantly, greatly increasing the quality of life of patients and their families, as well as reducing the negative socio-economic impact that the disease has.

Examples: In the central nervous system (CNS), oxidative stress is one of the main contributors to the development of diseases and aging. Recent studies have revealed that several isoforms of NADPH oxidase (Nox) enzymes, whose sole function is to produce reactive oxygen species (ROS), are also in the CNS. There, they play a key role in regulating ROS-dependent cellular mechanisms, but also, when at high levels, lead to cell dysfunction and death, accelerating the aging process characteristic of the pathological processes of neurodegenerative diseases.

Previous studies have demonstrated the importance of Nox's mediated oxidative stress in inducing neuronal loss in various neurological disorders, as is the case of PD, amyotrophic lateral sclerosis (ALS) and stroke. Those studies strengthen the importance of developing specific inhibitors for these enzymes, and the goal of several research laboratories, as well as pharmaceutical companies, such as GenKyoTex, a Swiss company, which is dedicated exclusively to the development of Nox inhibitors for future therapeutic application. For example, the synthesis of an inhibitor that specifically inhibits Nox's isoforms 1 and 4 (Bae et al., Synthesis and biological evaluation of 3-substituted 5-benzylidene-1-methyl-2-thiohydantoins as potent NADPH oxidase (NOX) inhibitors. Bioorg Med Chem 2016; 24:4144-4151) has been recently reported, but which is only soluble in a solvent containing Triton-X/Ethanol/PBS, which we found to be a vehicle that induces toxicity in dopaminergic neurons. The present disclosure put together the technology of ionic liquids and the inhibition of Nox's, to develop a new therapeutic strategy to target specific deleterious ROS productions involved in the pathological process of neurodegeneration. The following are three examples of the applicability of the invention:

Example 1: Parkinson's Disease (PD)

In an embodiment, PD is a chronic neurodegenerative disorder that affects more than 6.1 million people and its efficacy tends to decrease as the disease progresses to more debilitating stages, reducing the therapeutic options. According to the 2018 and 2020 reports on PD (The Parkinson's Disease Market: Pipeline Review, Developer Landscape and Competitive Insights, 2018, pp. Report ID: 4586296. Global Parkinson's Disease Market and Competitive Landscape", 2020, pp. Report ID: 5023386), the absence of preventive therapies to halt the progression of PD remains one of the main unmet needs in this area. In view of this, a paradigm shift towards the search/development of progression preventive therapies for the disease is occurring. In fact, 53% of drugs under development by pharmaceutical companies are disease-modifying agents that aim to prevent the progression of PD, and only 32% are symptomatic. The pathogenesis of PD is highly influenced by oxidative stress. Nox1-ROS generation plays a crucial role in the process of dopaminergic cell death and alpha-synucleinopathy that occurs in this disease and its inhibition in animal models prevents disease progression as described in the documents (Cristovao et al., The role of NADPH oxidase 1-derived reactive oxygen species in paraquat-mediated dopaminergic cell death. Antioxidants & redox signaling 2009; 11:9: 2105-18. Choi et al., NADPH Oxidase 1-Mediated Oxidative Stress Leads to Dopamine Neuron Death in Parkinson's Disease. Antioxidants & redox signaling 2012; 16 (10): 1033-45. Cristovao et al., NADPH oxidase 1 mediates α-synucleinopathy in Parkinson's disease. Journal of Neurosciences 2012; 32 (42): 14465-77). Furthermore, Nox4 has a crucial involvement in PD dementia, as demonstrated in the document "The Role of NOX4 in Parkinson's Disease with Dementia" (Choi et al. International Journal of Molecular Sciences 2019; 20 (3): 696) showing that increased expression of Nox4 in the hippocampal dentate gyrus in PD context induces Aβ expression and oligomer A11 production, and thereby reduces cognitive function. These documents validated Nox1 and Nox4 as important targets for the development of new therapeutic approaches to the disease. In this context, the present disclosure is a benefit for its possible application to the reformulation of Nox1-Nox4-specific inhibitors, which are currently available, but with poor solubility and so low pharmacological applicability. Increasing they solubility, makes them more bioavailable and so with higher therapeutic efficacy for PD.

Example 2: Stroke

In an embodiment, neurovascular diseases are the leading cause of death in the world. In terms of costs, stroke alone totals 64.1 billion euros (Europe) and 44.2 billion euros (United States of America) of expenses per year. Stroke occurs because of suppressing blood flow to the brain, caused by ischemia or hemorrhage. While approximately 20% of patients die within the first month after a stroke, survivors often develop severe neurological dysfunctions and chronic disabilities, which imposes a significant socio-economic burden. Current therapies only affect a small number of patients and can cause significant side effects.

The administration of anticoagulant drugs, such as aspirin, has a limited preventive power, while thrombolytic therapies, such as the recombinant tissue plasminogenic activator (rtPA), have a narrow therapeutic window and may induce cerebral hemorrhage, edema and ischaemic cell death as described by Suzuki et al. (Novel situations of endothelial injury in stroke—mechanisms of stroke and strategy of drug development: intracranial bleeding associated with the treatment of ischemic stroke: thrombolytic treatment of ischemia-affected endothelial cells with tissue-type plasminogen activator. Journal of pharmacological sciences 2011, 116, 25-29). The beneficial effects of surgical procedures, such as angioplasty, are still unclear, highlighting the importance and need to develop more efficient and safe therapies to treat these patients.

The document "Oxidative stress and pathophysiology of ischemic stroke: novel therapeutic opportunities" (CNS & neurological disorders drug targets 2013, 12, 698-714), demonstrates that increases in oxidative stress levels are associated with brain damage that occur after an ischaemic stroke. Furthermore, the document "Biochemistry, physiology, and pathophysiology of NADPH oxidases in the cardiovascular system" (Circulation research 2012, 110 (10), 1364-1390), reveals that different isoforms of Nox's, namely isoforms 1, 2, 4 and 5, are involved. In stroke, ROS derived from Nox's may have protective or deleterious function, depending on the isoform involved as proposed (Kleikers et al. NADPH oxidases as a source of oxidative stress and molecular target in ischemia/reperfusion injury. Journal of molecular medicine 2012, 90 (12), 1391-1406. Gray et al. Reactive Oxygen Species Can Provide Atheroprotection via NOX4-Dependent Inhibition of Inflammation and Vascular Remodeling. Arteriosclerosis, thrombosis, and vascular biology 2016 36 (2), 295-307). Considering this and making the specific inhibition of the isoform that participates in the pathological process associated with stroke, the development of antioxidant therapies for this disease, by inhibition of Nox, presents itself as having a great therapeutic potential to deal with this pathology. Thus, there is another potential application for the present disclosure.

Example 3: Amyotrophic Lateral Sclerosis (ALS)

Amyotrophic lateral sclerosis (ALS) is characterized by progressive degeneration of motor neurons and subsequent activation of glial cells leading to the development of muscle weakness and disability, and eventually fatal respiratory and cardiac deficits, between 3 to 5 years after its diagnosis. Despite the intensive research done so far, there is only one drug that has been approved for the treatment of ALS (riluzole), and its effect on survival is modest (de Jongh A D et al. Evidence for a multimodal effect of riluzole in patients with ALS? Journal of Neurology, Neurosurgery & Psychiatry 2019; 90:1183-1184). The pathological mechanisms underlying the development of this pathology are still largely unknown; however, the contribution of oxidative stress is once again a factor that promotes the development of the disease, and the participation of Nox's in this process has also been documented (Harraz et al. SOD1 mutations disrupt redox-sensitive Rac regulation of NADPH oxidase in a familial ALS model. The Journal of clinical investigation 2008, 118 (2), 659-670).

Previous studies investigating the role of Nox's in ALS patients found that those with lower isoform 2 activity in peripheral blood showed significant increases in survival time (Marrali et al. NADPH oxidase (NOX2) activity is a modifier of survival in ALS. Journal of neurology 2014, 261 (11), 2178-2183). The same was observed by Marden et al. (Redox modifier genes in ALS in mice. The Journal of clinical investigation 2007, 117 (10), 2913-2919), in mice with ALS. However, knockouts for Nox's isoforms 1 and 2 showed to increase survival and delay in the onset of the development of the disease. On the other hand, treatment with the broad inhibitor apocynin (Apo) in an in vitro model of ALS improved the survival of motor neurons when co-cultured with astrocytes carrying a mutation associated with the development of the disease (Marrali et al. NADPH oxidase (NOX2) activity is a modifier of survival in ALS. Journal of neurology 2014, 261 (11), 2178-2183), further reinforcing that inhibition of Nox's may have a neuroprotective role in ALS. The pharmacological inhibition of Nox's also showed benefits in animal models of ALS. Increasing survival time by almost 50%, as well as leading to an increased number of motor neurons in the spinal cord (Harraz et al. SOD1 mutations disrupt redox-sensitive Rac regulation of NADPH oxidase in a familial ALS model. The Journal of clinical investigation 2008, 118 (2), 659-670). In this case, the potential application of our disclosure becomes even stronger, since the reformulations of Nox's inhibitors can lead to an increase in its effectiveness and expand the neuroprotective effect already described so far with Apo.

Table 1 depicts the samples used in the assays of the present disclosure.

TABLE 1 identification of the samples

| | |
|---|---|
| Sample 1 | Control cells |
| Sample 2 | Cells exposed to Cholinium chloride (20 µM) |
| Sample 3 | Cells exposed [Chol]$_2$[N1(4)inh] + N1(4)inh(20 µM) |
| Sample 4 | Cells exposed to MPP+ (10 µM) |
| Sample 4 | Cells exposed to MPP+ (10 µM) and [Chol]$_2$[N1(4)inh] + N1(4)inh (20 µM) |
| Sample 6 | Cells exposed to MPP+ (10 µM) and Cholinium cloride (20 µM) |
| Sample 7 | Cells exposed to 6OHDA (50 µM) |
| Sample 8 | Cells exposed to 6OHDA (50 µM) and [Chol]$_2$[N1(4)inh] N1(4)inh (20 µM) |
| Sample 9 | Cells exposed to 6OHDA (50 µM) and Cholinium cloride (20 µM) |
| Sample 10 | *Substantia nigra* exposed to saline |
| Sample 11 | *Substantia nigra* exposed to [Chol]$_2$[N1(4)inh] + N1(4)inh (0.2 mg/kg/day) |
| Sample 12 | *Substantia nigra* exposed to 6OHDA (10 µg/2 µl) |
| Sample 13 | *Substantia nigra* exposed to 6OHDA (10 µg/2 µl) and [Chol]$_2$[N1(4)inh] + N1(4)inh(0.2 mg/kg/day) |
| Sample 14 | All mice organs exposed to 0.02; 0.04; 0.06; 0.16 mg/kg/day of [Chol]$_2$[N1(4)inh] + N1(4)inh |
| Sample 15 | All mice organs exposed to 0.16 mg/kg/day of [Chol]$_2$[N1(4)inh] + N1(4)inh |
| Sample 16 | All rats organs exposed to 0.007 mg/kg/day of [Chol]2[N1(4)inh] + N1(4)inh |
| Sample 17 | All rats organs exposed to 0.062 mg/kg/day of [Chol]2[N1(4)inh] + N1(4)inh |
| Sample 18 | All rats organs exposed to 2.5 mg/kg/day of PQ |
| Sample 19 | All rats organs exposed to 2.5 mg/kg/day of PQ and to 0.007 mg/kg/day of [Chol]2[N1(4)inh] + N1(4)inh |
| Sample 20 | All rats organs exposed to 2.5 mg/kg/day of PQ and to 0.062 mg/kg/day of [Chol]2[N1(4)inh] + N1(4)inh |

In an embodiment, for the synthesis of [Chol]$_2$[N1(4)inh], a cholinium salt was used as the cation source and 3-cyclohexyl-5-(2,4-dihydroxybenzylidene)-1-methyl-2-thiohydantoin (N1(4)inh) as the anion source. The [Chol]$_2$[N1

(4)inh] was synthesized by metathesis reaction with 1:1.05 mole ratio of cholinium bicarbonate (80% in water, m/v) and N1(4)inh solution prepared in a minimum amount of absolute ethanol. The N1(4)inh was mixed by drop-wise addition into the cholinium bicarbonate solution under dark and cold conditions (using an ice-bath at ~5° C.) and with continuous stirring. The reaction mixture was further kept at ~5° C. under continuous stirring for 2 h. The excess solvent and water were removed under continuous flow of nitrogen gas until complete drying (~2-3 h of nitrogen gas flow with the IL containing vial maintained in the ice-cold water bath (~10° C.)). The synthesized $[Chol]_2[N1(4)inh]$ and N1(4)inh mixture (1:1, mol:mol) was finally collected from the ice-cold water bath and stored under dried, cool and dark conditions.

In an embodiment, FIG. 1 show $^1$H NMR spectra of: 2a) the Specific Nox1(4)inhibitor (N1(4)inh) and 2b) the IL-based formulation of the Specific Nox1(4)inhibitor ($[Chol]_2[N1(4)inh]+N1(4)inh$).

The purity of $[Chol]_2[N1(4)inh]+N1(4)inh$ was evaluated by $^1$H NMR. FIG. 1a discloses the $^1$H NMR spectra and the identification of the respective peaks for the specific Nox1(4)inhibitor (N1(4)inh), whereas FIG. 1b reveals the $^1$H NMR spectra and the identification of the respective peaks for the IL-based formulation of the specific Nox1(4)inhibitor ($[Chol]_2[N1(4)inh]+N1(4)inh$) disclosing that the $[Chol]_2[N1(4)inh]$ was successfully synthetized.

In an embodiment, FIG. 2 shows $^{13}$C NMR spectra of: 3a) the Specific Nox1(4)inhibitor (N1(4)inh) and 3b) the IL-based formulation of the Specific Nox1(4)inhibitor ($[Chol]_2[N1(4)inh]+N1(4)inh$).

The purity of $[Chol]_2[N1(4)inh]+N1(4)inh$ and N1(4)inh was also evaluated by $^{13}$C NMR. FIG. 2a discloses the $^{13}$C NMR spectra and the identification of the respective peaks for the specific Nox1(4) inhibitor (N1(4)inh), whereas FIG. 2b reveals the $^{13}$C NMR spectra and the identification of the respective peaks for the IL-based formulation of the specific Nox1(4)inhibitor ($[Chol]_2[N1(4)inh]+N1(4)inh$) disclosing that the $[Chol]_2[N1(4)inh]+N1(4)inh$ was successfully synthetized.

In an embodiment, FIG. 3 shows the solubility of the Nox1(4)inhibitor (N1(4)inh) and of the IL-based formulation ($[Chol]_2[N1(4)inh]+N1(4)inh$), in mg/mL, in water and PBS.

In an embodiment, solutes (N1(4)inh and $[Chol]_2[N1(4)inh]+N1(4)inh$) were added in excess to a fixed volume (500 µL) of water and PBS solution. These mixtures were incubated at 37° C., under constant agitation 1150 rpm and for a minimum of 72 h, using an Eppendorf Thermomixer Comfort equipment. Throughout this process, solute was added to the mixture, whenever necessary, i.e., until achieving the solution saturation. All samples were filtered using syringe filters (0.45 µm) to remove possible suspended solid particles. The quantification of N1(4)inh and $[Chol]_2[N1(4)inh]+N1(4)inh$ was carried by UV-spectroscopy, using a UV-spectrophotometry (SYNERGY|HT microplate reader, BioTek) at a wavelength of 416 nm and 480 nm, respectively. The interference of the PBS with the quantification method was also ascertained and blank control samples were always used. The obtained results disclose that the solubility of the IL-based formulation in water increased 36 fold whereas the solubility in PBS increased 21 fold.

In an embodiment, FIG. 4 shows the solubility of the Nox1(4)inhibitor (N1(4)inh) and of the IL-based formulation ($[Chol]2[N1(4)inh]+N1(4)inh$), in mol/L, in water and PBS.

In an embodiment, solutes (N1(4)inh and $[Chol]2[N1(4)inh]+N1(4)inh$) were added in excess to a fixed volume (500 µL) of water and PBS solution. These mixtures were incubated at 37° C., under constant agitation 1150 rpm and for a minimum of 72 h, using an Eppendorf Thermomixer Comfort equipment. Throughout this process, solute was added to the mixture, whenever necessary, i.e., until achieving the solution saturation. All samples were filtered using syringe filters (0.45 µm) to remove possible suspended solid particles. The quantification of N1(4)inh and $[Chol]2[N1(4)inh]+N1(4)inh$ was carried by UV-spectroscopy, using a UV-spectrophotometry (SYNERGY|HT microplate reader, BioTek) at a wavelength of 416 nm and 480 nm, respectively. The interference of the PBS with the quantification method was also ascertained and blank control samples were always used. The obtained results disclose that the solubility of the IL-based formulation in water increased 28 fold whereas the solubility in PBS increased 16 fold.

In an embodiment, FIG. 5 shows the decomposition temperature of $[Chol]2[N1(4)inh]+N1(4)inh$ assessed by thermogravimetric analysis (TGA).

In an embodiment, the decomposition temperature was determined by thermogravimetric analysis (TGA). The TGA curve reveals a sharp decrease in the degradation temperature at around 200° C., demonstrating that $[Chol]2[N1(4)inh]+N1(4)inh$ decomposition starts occurring at 200° C., and as also shown by the precursor.

In an embodiment, FIG. 6 shows the effects of $[Chol]2[N1(4)inh]+N1(4)inhinh$ on the viability of N27 dopaminergic neuronal cells.

In an embodiment, the potential toxicity of $[Chol]2[N1(4)inh]+N1(4)inh$ towards N27 dopaminergic neurons was evaluated after 24 h of exposure to 20 µM or 30 µM of $[Chol]2[N1(4)inh]+N1(4)inh$. No statistically significant differences were observed between treatments and control cells (CTR/untreated cells), demonstrating that the IL-based formulation of $[Chol]2[N1(4)inh]+N1(4)inh$ is not toxic to dopaminergic neurons. The data are expressed as a percentage of CTR and shown as the mean±SEM of at least five repetitions of three independent experiments (n=3). Statistical analysis was performed using one-way ANOVA (non-parametric analysis), followed by the Kruskal-Wallis test followed by Dunn's multiple comparison test. ① Control cells; ② Cells exposed to 20 µM of $[Chol]_2[N1(4)inh]+N1(4)inh$; ③ Cells exposed to 30 µM of $[Chol]_2[N1(4)inh]+N1(4)inh$.

In an embodiment, FIG. 7 shows that the pretreatment of dopaminergic neuronal cells (N27) with $[Chol]_2[N1(4)inh]+N1(4)inh$ significantly prevents the neurotoxic effect of 6OHDA. ① Control group-untreated cells. ② Cholinium Control. ③ 6OHDA significantly reduced dopaminergic neurons viability, compared with control cells ①. ④ Pretreatment with $[Chol]_2[N1(4)inh]+N1(4)inh$ significantly reduced dopaminergic neurotoxicity induced by 6OHDA, compared with ③ 6OHDA treated cells. 5 Choliniumchloride did not prevent 6OHDA induced neurotoxicity, as compared with ③ 6OHDA treated cells. Cell viability was measured using the WST-8 assay in N27 cells pretreated with 20 µM of $[Chol]_2[N1(4)inh]+N1(4)inh$ or cholinium chloride for 2.5 h and then exposed for 24 h to 50 µM of 6OHDA. The data are presented as percentage of control and presented as the mean±SEM of at least five repetitions of three independent experiments (n=3). Statistical analysis was performed using one-way ANOVA (non-parametric analysis), followed by the Kruskal-Wallis test, followed by Dunn's multiple comparison test. **p<0.01 compared to CTR or the group of cells exposed to cholinium chloride only +++p<0.001 compared to 6OHDA. ① Control cells; ② Cells exposed to cholinium chloride (20 μM); ③ Cells exposed to 6OHDA (50 M); ④ Cells exposed to 6OHDA and [Chol]$_2$[N1(4)inh]+N1(4)inh (20 μM); ⑤ Cells exposed to 6OHDA (50 μM) and cholinium chloride (20 μM).

In an embodiment, FIG. 8 shows that the pretreatment of dopaminergic neuronal cells (N27) with [Chol]$_2$[N1(4)inh]+N1(4)inh significantly prevents the neurotoxic effect of the neurotoxin MPP. ① Control group-untreated cells. ② Cholinium chloride Control. ③ MPP+ significantly reduced dopaminergic neurons viability. ④ Pretreatment with [Chol]$_2$[N1(4)inh]+N1(4)inh significantly reduced MPP+ induced dopaminergic neurotoxicity. ⑤ Cholinium chloride did not prevent MPP+ induced neurotoxicity. Cell viability was measured using the WST-8 assay in N27 cells pretreated with 20 μM of [Chol]$_2$[N1(4)inh]+N1(4)inh or cholinium chloride for 2.5 h and then exposed for 24 hours at 10 μM MPP+. The data are presented as percentage of control as the mean±SEM of at least five repetitions of three independent experiments (n=3). Statistical analysis was performed using one-way ANOVA (non-parametric analysis), Kruskal-Wallis test, followed by Dunn's multiple comparison test. p<0.01 when compared to CTR (untreated cells); +++p<0.001 compared to the group of cells treated with MPP+; *p<0.001 comparing with CTR or the group of cells exposed to Cholinium Chloride only. ① Control cells; ② Cells exposed to Cholinium chloride (20 μM); ③ Cells exposed to MPP+ (10 μM); ④ Cells exposed to MPP+ (10 μM) and [Chol]$_2$[N1(4)inh]+N1(4)inh (20 μM); ⑤ Cells exposed to MPP+ (10 μM) and cholinium chloride (20 μM).

In an embodiment, FIG. 9 shows the effect of [Chol]$_2$[N1(4)inh]+N1(4)inh brain intraventricular infusion in dopaminergic neurons viability on mice substantia nigra (SN).

In an embodiment, changes in the number of tyrosine hydroxylase (TH)-immunoreactive neurons in mice SN, 7 days after brain intraventricular infusion of 0.2 mg/kg/day of [Chol]$_2$[N1(4)inh]+N1(4)inh. ① Control group (saline only); ② [Chol]$_2$[N1(4)inh]+N1(4)inh treated group. The number of TH-positive neurons in the SN of mice treated with [Chol]$_2$[N1(4)inh]+N1(4)inh, is not statistically different from the ones quantified in the SN of control group (② compared with ①), demonstrating that the IL-based formulation of [Chol]$_2$[N1(4)inh]+N1(4)inh is not toxic to dopaminergic neurons in vivo. The results are expressed as a percentage of Saline (Group ① which are animals exposed only to saline solution) and represented as the mean±SEM of at least 3 independent experiments (n=3-4). Statistical analysis performed using one-way ANOVA, followed by a multiple comparison analysis using the Bonferroni test. No statistical differences were found between the two groups.

In an embodiment, FIG. 10 shows that brain intraventricular infusion of [Chol]$_2$[N1(4)inh]+N1(4)inh prevented the death of dopaminergic neurons in substantia nigra (SN) induced by intrastriatal injection of 6OHDA, an animal model for Parkinson's disease. Changes in the number of tyrosine hydroxylase (TH)-immunoreactive neurons in mice SN, 7 days after treatment with 6OHDA in the presence or absence of [Chol]$_2$[N1(4)inh]+N1(4)inh. ① Control group (saline only); ② 6-OHDA treated group; ③ 6OHDA and [Chol]$_2$[N1(4)inh]+N1(4)inh co-treated group. The number of TH-positive neurons decreased significantly in animals treated with 6OHDA (② compared with ①). This decrease was significantly prevented in mice co-treated with 6OHDA and [Chol]$_2$[N1(4)inh]+N1(4)inh (③ compared with ②). The number of TH-positive neurons in the SN of mice co-treated with 6OHDA and [Chol]$_2$[N1(4)inh]+N1(4)inh, is not statistically different from the ones observed in the control group (③ compared with ①). The results are expressed as a percentage of Saline (Group ① which are animals exposed only to saline solution) and represented as the mean±SEM of at least 3 independent experiments (n=3-4). Statistical analysis performed using one-way ANOVA, followed by a multiple comparison analysis using the Bonferroni test. **p<0.01 when compared to the control animal group (② versus ①); ##p<0.01 when compared to the group of animals exposed only to 6OHDA (③ versus ②).

In an embodiment FIG. 11 shows the effect of 14 days [Chol]$_2$[N1(4)inh]+N1(4)inh intranasal administration on mice weight. Weight variation overtime induced by the intranasal administration of four different doses of [Chol]$_2$[N1(4)inh]+N1(4)inh, namely 0.02; 0.04; 0.08; 0.16 mg/kg/day, twice a day for 14 days. The results are expressed as the mean of at least 5 independent experiments (n=5-6). Statistical analysis performed using two-way ANOVA, followed by a multiple comparison analysis using Tukey test. No statistical differences were found between the groups.

FIG. 12 shows the effect of 14 days [Chol]$_2$[N1(4)inh]+N1(4)inh intranasal administration on mice motor performance. Motor performance changes induced by the intranasal administration of four different doses of [Chol]$_2$[N1(4)inh]+N1(4)inh, namely ① vehicle, ② 0.02; ③ 0.04; ④ 0.08; ⑤ 0.16 mg/kg/day, twice a day for 14 days. The results are expressed as the mean±SEM of at least 5 independent experiments (n=5-6). Statistical analysis performed using one-way ANOVA, followed by a multiple comparison analysis using Bonferroni's test. No statistical differences were found between the groups.

FIG. 13 shows the effect of 14 days [Chol]2[N1(4)inh]+N1(4)inh intranasal administration on mice olfactory function. Olfactory function changes induced by the intranasal administration of 0.16 mg/kg/day of [Chol]2[N1(4)inh]+N1(4)inh twice a day for 14 days. ① Vehicle (untreated group); ② 0.016 mg/kg/day of [Chol]2[N1(4)inh]+N1(4)inh treated group. The results are expressed as the mean±SEM of at least 5 independent experiments (n=5-6). Statistical analysis performed using Unpaired Student T-test. No statistical differences were found between the groups.

FIG. 14 shows the effect of 30 days [Chol]2[N1(4)inh]+N1(4)inh brain intra-ventricle administration on rats weight. Weight variation overtime induced by the brain intra-ventricle infusion of 0.007 mg/kg/day of [Chol]2[N1(4)inh]+N1(4)inh, once a day for 30 days. The results are expressed as the mean of at least 4 independent experiments (n=4-5). Statistical analysis performed using one-way ANOVA, followed by a multiple comparison analysis using Bonferroni's test. No statistical differences were found between the groups.

FIG. 15 shows the effect of 30 days [Chol]2[N1(4)inh]+N1(4)inh brain intra-ventricle administration on rats motor performance. Motor performance changes induced by the brain intra-ventricle infusion of 0.007 mg/kg/day of [Chol]2[N1(4)inh]+N1(4)inh, once a day for 30 days. ① Vehicle (untreated group); ② 0.007 mg/kg/day of [Chol]2[N1(4)inh]+N1(4)inh treated group. The results are expressed as the mean of at least 4 independent experiments (n=4-5). Statistical analysis performed using Unpaired Student T-test. No statistical differences were found between the groups.

FIG. 16 shows the effect of 30 days [Chol]2[N1(4)inh]+N1(4)inh intranasal administration on rats weight. Weight variation induced by intranasal administration of 0.062 mg/kg/day of [Chol]2[N1(4)inh]+N1(4)inh, once a day for 30 days. The results are expressed as the mean of at least 4 independent experiments (n=4-5). Statistical analysis performed using two-way ANOVA, followed by a multiple comparison analysis using Tukey test. No statistical differences were found between the groups.

FIG. 17 shows the effect of 30 days [Chol]2[N1(4)inh]+N1(4)inh intranasal administration on rats motor performance. Motor performance changes induced by intranasal administration of 0.062 mg/kg/day of [Chol]2[N1(4)inh]+N1(4)inh, once a day for 30 days. ① Vehicle (untreated group); ② 0.062 mg/kg/day of [Chol]2[N1(4)inh]+N1(4)inh treated group. The results are expressed as the mean of at least 4 independent experiments (n=4-5). Statistical analysis performed using Unpaired Student T-test. No statistical differences were found between the groups.

FIG. 18 shows the effect of 30 days [Chol]2[N1(4)inh]+N1(4)inh intranasal administration on rats olfactory function. Olfactory function changes induced by the intranasal administration of 0.062 mg/kg/day of [Chol]2[N1(4)inh]+N1(4)inh once a day for 30 days. ① Vehicle (untreated group); ② 0.062 mg/kg/day of [Chol]2[N1(4)inh]+N1(4)inh treated group. The results are expressed as the mean±SEM of at least 4 independent experiments (n=5-6). Statistical analysis performed using Unpaired Student T-test. No statistical differences were found between the groups.

FIG. 19 shows that brain intraventricular infusion of $[Chol]_2[N1(4)inh]+N1(4)inh$ prevented the progression of motor dysfunction induced by PQ in rats, an animal model for PD. Changes in the latency to fall of animals exposed to 30 days to PQ in the presence or absence of 0.007 mg/kg/day $[Chol]_2[N1(4)inh]+N1(4)inh$ for extra 30 days, were recorded using rotarod test. ① Control group (saline only); ② PQ treated group; ③ PQ and $[Chol]_2[N1(4)inh]+N1(4)inh$ co-treated group. The latency to fall decreased significantly in animals treated with PQ (② compared with ①). This decrease was significantly prevented in rats co-treated with PQ and [Chol]2[N1(4)inh]+N1(4)inh (③ compared with ②). The latency to fall of rats co-treated with PQ and $[Chol]_2[N1(4)inh]+N1(4)inh$, is not statistically different from the ones observed in the control group (③ compared with ①). The results are represented as the mean±SEM of at least 4 independent experiments (n=4-6). Statistical analysis performed using one-way ANOVA, followed by a multiple comparison analysis using the Bonferroni test. ***$p<0.001$ when compared to the control animal group (② versus ①); ###$p<0.001$ when compared to the group of animals exposed only to PQ (③ versus ②).

FIG. 20 shows that brain intraventricular infusion of $[Chol]_2[N1(4)inh]+N1(4)inh$ prevented the progression of motor dysfunction induced by PQ in rats, an animal model for PD. Changes in the distance travelled of animals exposed to 30 days to PQ in the presence or absence of 0.007 mg/kg/day $[Chol]_2[N1(4)inh]+N1(4)inh$ for extra 30 days, were recorded using Open-field test. ① Control group (saline only); ② PQ treated group; ③ PQ and $[Chol]_2[N1(4)inh]+N1(4)inh$ co-treated group. The distance travelled decreased significantly in animals treated with PQ (② compared with ①). This decrease was significantly prevented in rats co-treated with PQ and [Chol]2[N1(4)inh]+N1(4)inh (③ compared with ②). The distance travelled of rats co-treated with PQ and $[Chol]_2[N1(4)inh]+N1(4)inh$, is not statistically different from the ones observed in the control group (③ compared with ①). The results are represented as the mean±SEM of at least 4 independent experiments (n=4-6). Statistical analysis performed using one-way ANOVA, followed by a multiple comparison analysis using the Bonferroni test. **$p<0.01$ when compared to the control animal group (② versus ①); #$p<0.05$ when compared to the group of animals exposed only to PQ (③ versus ②).

FIG. 21 shows that brain intraventricular infusion of $[Chol]_2[N1(4)inh]+N1(4)inh$ prevented the progression of motor dysfunction induced by PQ in rats, an animal model for PD. Changes in the speed of animals exposed to 30 days to PQ in the presence or absence of 0.007 mg/kg/day $[Chol]_2[N1(4)inh]+N1(4)inh$ for extra 30 days, were recorded using Open-field test. ① Control group (saline only); ② PQ treated group; ③ PQ and $[Chol]_2[N1(4)inh]+N1(4)inh$ co-treated group. The speed decreased significantly in animals treated with PQ (② compared with ①). This decrease was significantly prevented in rats co-treated with PQ and [Chol]2[N1(4)inh]+N1(4)inh (③ compared with ②). The speed of rats co-treated with PQ and $[Chol]_2[N1(4)inh]+N1(4)inh$, is not statistically different from the ones observed in the control group (③ compared with ①). The results are represented as the mean±SEM of at least 4 independent experiments (n=4-6). Statistical analysis performed using one-way ANOVA, followed by a multiple comparison analysis using the Bonferroni test. **$p<0.01$ when compared to the control animal group (② versus ①); #$p<0.05$ when compared to the group of animals exposed only to PQ (③ versus ②).

FIG. 22 shows that intranasal administration of $[Chol]_2[N1(4)inh]+N1(4)inh$ prevented the progression of motor dysfunction induced by PQ in rats, an animal model for PD. Changes in the latency to fall of animals exposed to 30 days to PQ in the presence or absence of 0.062 mg/kg/day $[Chol]_2[N1(4)inh]+N1(4)inh$ for extra 30 days, were recorded using Rotarod test. ① Control group (saline only); ② PQ treated group; ③ PQ and $[Chol]_2[N1(4)inh]+N1(4)inh$ co-treated group. The latency to fall decreased significantly in animals treated with PQ (② compared with ①). This decrease was significantly prevented in rats co-treated with PQ and [Chol]2[N1(4)inh]+N1(4)inh (③ compared with ②). The latency to fall of rats co-treated with PQ and $[Chol]_2[N1(4)inh]+N1(4)inh$, is not statistically different from the ones observed in the control group (③ compared with ①). The results are represented as the mean±SEM of at least 4 independent experiments (n=4-6). Statistical analysis performed using one-way ANOVA, followed by a multiple comparison analysis using the Bonferroni test. **$p<0.01$ when compared to the control animal group (② versus ①); #$p<0.05$ when compared to the group of animals exposed only to PQ (③ versus ②).

The term "comprising" whenever used in this document is intended to indicate the presence of stated features, integers, steps, components, but not to preclude the presence or addition of one or more other features, integers, steps, components or groups thereof.

Where singular forms of elements or features are used in the specification of the claims, the plural form is also included, and vice versa, if not specifically excluded. For example, the term "an ionic liquid" or "the ionic liquid" also includes the plural forms "ionic liquids" or "the ionic liquids," and vice versa. In the claims articles such as "a," "an," and "the" may mean one or more than one unless indicated to the contrary or otherwise evident from the context. Claims or descriptions that include "or" between one or more members of a group are considered satisfied if one, more than one, or all of the group members are present in, employed in, or otherwise relevant to a given product or process unless indicated to the contrary or otherwise evident from the context. The invention includes embodiments in which exactly one member of the group is present in, employed in, or otherwise relevant to a given product or process. The invention also includes embodiments in which more than one, or all of the group members are present in, employed in, or otherwise relevant to a given product or process.

Furthermore, where the claims recite a composition, it is to be understood that methods of using the composition for any of the purposes disclosed herein are included, and methods of making the composition according to any of the methods of making disclosed herein or other methods known in the art are included, unless otherwise indicated or unless it would be evident to one of ordinary skill in the art that a contradiction or inconsistency would arise.

The disclosure should not be seen in any way restricted to the embodiments described and a person with ordinary skill in the art will foresee many possibilities to modifications thereof.

The embodiments described above are combinable.

The following claims further set out particular embodiments of the disclosure.

The invention claimed is:

1. An ionic liquid comprising an anion with formula

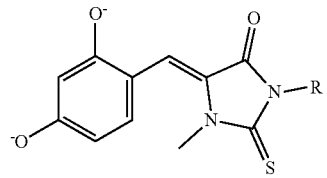

wherein R is an alkyl group, or a cycloalkyl group;
and a cation selected from the list consisting of cholinium, tetralkylammonium, tetraalkylphosphonium, or 1-alkyl-3-methylimidazolium cation families.

2. The ionic liquid according to claim 1 wherein the molar ratio of the anion and the cation ranges from 1:2 to 2:1 mol:mol.

3. The ionic liquid according to claim 1 wherein R is a cycloalkyl group from C3-C7.

4. The ionic liquid according to claim 1 wherein R is an unsubstituted cycloalkyl group from C3-C7.

5. The ionic liquid according to claim 1 wherein R is a cyclohexyl group.

6. The ionic liquid according to claim 1 wherein the cation is cholinium.

7. The ionic liquid according to claim 1, wherein the anion is 3-substituted 5-benzylidene-1-methyl-2-thiohydantoin or 3-cyclohexyl-5-(2,4-dihydroxybenzylidene)-1-methyl-2-thiohydantoin.

8. The ionic liquid according to claim 1 for use in medicine or as medicament.

9. The ionic liquid according to claim 1 for use in slowing down the progression of Parkinson's Disease.

10. The ionic liquid according to claim 1 for use to prevent motor dysfunction in Parkinson's disease.

11. The ionic liquid according to claim 1 for use in the prevention or treatment of amyotrophic lateral sclerosis.

12. A pharmaceutical composition comprising a therapeutically effective amount of the ionic liquid according to claim 1 and a pharmaceutically acceptable carrier.

13. The pharmaceutical composition according to claim 12, wherein the therapeutically effective amount ranges from 0.005 mM to 10 mM.

14. The pharmaceutical composition according to claim 12 wherein the composition is an injectable form, an intranasal form, an intrathecal form or a brain intraventricular form.

15. The pharmaceutical composition according to claim 12 for administration of a daily dose to a person with a disease or disorder of the central nervous system.

16. The pharmaceutical composition according to claim 15 wherein the dosage amount is less than 1000 mg/day.

* * * * *